US011838350B2

(12) United States Patent
Ciabarra, Jr.

(10) Patent No.: US 11,838,350 B2
(45) Date of Patent: *Dec. 5, 2023

(54) TECHNIQUES FOR IDENTIFYING ISSUES RELATED TO DIGITAL INTERACTIONS ON WEBSITES

(71) Applicant: Quantum Metric, Inc., Colorado Springs, CO (US)

(72) Inventor: Mario Luciano Ciabarra, Jr., Colorado Springs, CO (US)

(73) Assignee: Quantum Metric, Inc., Colorado Springs, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/743,346

(22) Filed: May 12, 2022

(65) Prior Publication Data
US 2022/0279032 A1     Sep. 1, 2022

Related U.S. Application Data

(63) Continuation of application No. 16/952,580, filed on Nov. 19, 2020, now Pat. No. 11,343,303, which is a
(Continued)

(51) Int. Cl.
*H04L 67/02* (2022.01)
*H04L 43/0852* (2022.01)
*G06F 11/36* (2006.01)

(52) U.S. Cl.
CPC ............. *H04L 67/02* (2013.01); *G06F 11/36* (2013.01); *H04L 43/0852* (2013.01)

(58) Field of Classification Search
CPC .. G06F 11/36; G06F 11/0709; G06F 11/0751; G06F 11/3664; G06F 11/3688;
(Continued)

(56) References Cited

U.S. PATENT DOCUMENTS 7,523,191 B1   4/2009  Thomas et al.
7,941,525 B1   5/2011  Yavilevich
(Continued)

OTHER PUBLICATIONS

U.S. Appl. No. 16/281,075, "Non-Final Office Action", dated Jul. 16, 2020, 10 pages.
(Continued)

*Primary Examiner* — Jason D Recek
(74) *Attorney, Agent, or Firm* — Kilpatrick Townsend & Stockton LLP

(57) ABSTRACT

Techniques are described herein for identifying issues related to digital interactions. For example, a detection system may be provided to analyze suspect sessions to determine if one or more stages associated with the suspect sessions are underperforming compared to corresponding stages associated with similar sessions. The detection system may provide a user interface that allows a user to select one or more attributes that may be associated with one or more sessions. Selection of the one or more attributes may identify multiple sessions (referred to as suspect sessions herein). The one or more suspect sessions may be analyzed to determine whether one or more stages associated with the one or more suspect sessions are underperforming compared to corresponding stages associated with one or more other sessions determined to be similar to the one or more suspect sessions.

20 Claims, 10 Drawing Sheets

Related U.S. Application Data continuation of application No. 16/281,075, filed on Feb. 20, 2019, now Pat. No. 10,880,358.

(60) Provisional application No. 62/632,853, filed on Feb. 20, 2018.

(58) Field of Classification Search
CPC ........... G06F 2201/875; H04L 43/0852; H04L 67/02
See application file for complete search history.

(56) References Cited

U.S. PATENT DOCUMENTS

| | | |
|---|---|---|
| 9,508,081 B2 | 11/2016 | Yavilevich |
| 9,792,365 B2 | 10/2017 | Yavilevich |
| 10,063,645 B2 | 8/2018 | Yavilevich et al. |
| 10,079,737 B2 | 9/2018 | Schlesinger et al. |
| 10,880,358 B2 | 12/2020 | Ciabarra, Jr. |
| 11,343,303 B2 | 5/2022 | Ciabarra, Jr. |
| 2005/0177613 A1 | 8/2005 | Dresden |
| 2008/0086558 A1 | 4/2008 | Bahadori et al. |
| 2011/0320880 A1 | 12/2011 | Wenig et al. |
| 2012/0036256 A1 | 2/2012 | Shen et al. |
| 2015/0058077 A1 | 2/2015 | Buban et al. |
| 2015/0348059 A1 | 12/2015 | Agara et al. |
| 2017/0032417 A1 | 2/2017 | Amendjian et al. |
| 2017/0116658 A1* | 4/2017 | Baid ................... G06Q 30/0625 |
| 2018/0152410 A1* | 5/2018 | Jackson ................ H04L 51/224 |

OTHER PUBLICATIONS

U.S. Appl. No. 16/281,075, "Notice of Allowance", dated Nov. 9, 2020, 8 pages.
U.S. Appl. No. 16/952,580, "Corrected Notice of Allowability", dated Feb. 2, 2022, 4 pages.
U.S. Appl. No. 16/952,580, "Non-Final Office Action", dated Oct. 12, 2021, 11 pages.
U.S. Appl. No. 16/952,580, "Notice of Allowance", dated Jan. 19, 2022, 7 pages.
International Application No. EP19758168.9, "Extended European Search Report", dated Oct. 20, 2021, 9 pages.
International Application No. IL288791, "Office Action", dated Apr. 25, 2022, 3 pages.
International Application No. IL288791, "Office Action", dated May 15, 2022, 7 pages.
International Application No. PCT/US2019/018849, "International Preliminary Report on Patentability", dated Sep. 3, 2020, 6 pages.
International Application No. PCT/US2019/018849, "International Search Report and Written Opinion", dated May 14, 2019, 7 pages.
International Application No. EP19758168.9, "Office Action", dated Mar. 1, 2023, 5 pages.

* cited by examiner

FIG. 3A

TECHNIQUES FOR IDENTIFYING ISSUES RELATED TO DIGITAL INTERACTIONS ON WEBSITES

CROSS-REFERENCE TO RELATED APPLICATIONS

The present application is a continuation of, and claims the benefit and priority from U.S. application Ser. No. 16,952,580, filed Nov. 19, 2020, entitled "TECHNIQUES FOR IDENTIFYING ISSUES RELATED TO DIGITAL INTERACTIONS ON WEB SITES, which is a continuation of U.S. application Ser. No. 16/281,075, filed Feb. 20, 2019, now U.S. Pat. No. 10,880,358, entitled "TECHNIQUES FOR IDENTIFYING ISSUES RELATED TO DIGITAL INTERACTIONS ON WEBSITES," which claims the benefit and priority under 35 U.S.C. 119(e) of U.S. Provisional Application No. 62/632,853, filed Feb. 20, 2018, entitled "TECHNIQUES FOR IDENTIFYING ISSUES RELATED TO DIGITAL INTERACTIONS ON WEB SITES," the entire contents of which are herein incorporated by reference for all purposes.

BACKGROUND

The present disclosure relates generally to identifying issues arising in digital interactions. For example, an issue may include a software bug, interface design flaw, or processing delay on a particular webpage of a website that hinders a user (e.g., website visitor) from taking an action on the website. In some cases, the issue causes the user to abandon the website out of frustration. Traditionally, such issues were identified based upon user feedback and user activity monitoring for an entire website. While user feedback and activity monitoring may be used to identify the user's likes and dislikes and the overall performance of the website, these techniques may not be able to accurately determine the elements or attributes of the website causing the issues. For instance, users that provide feedback may not have the technical knowledge to explain the details of the issue they experienced. Furthermore, such feedback is based on human memory which can be unreliable. And, activity monitoring across the entire webpage does identify which particular webpages or interactions are causing the issues. As digital interactions become more common, digital administrators desire tools to identify the issues quicker and more efficiently. Therefore, there is a need for improved systems and methods to identify attributes or elements in the webpages causing such issues arising in digital interactions.

SUMMARY

Techniques are described herein for identifying issues related to digital interactions. For example, a detection system may be provided to analyze suspect sessions to determine if one or more stages associated with the suspect sessions are underperforming compared to corresponding stages associated with similar sessions.

The detection system may provide a user interface that allows a user to select one or more attributes that may be associated with one or more sessions. Selection of the one or more attributes may identify multiple sessions (referred to as suspect sessions herein). The one or more suspect sessions may be analyzed to determine whether one or more stages associated with the one or more suspect sessions are underperforming compared to corresponding stages associated with one or more other sessions determined to be similar to the one or more suspect sessions.

In one illustrative example, a website may present one or more webpages to a user, each webpage (and/or change in a webpage) representing a different stage in a conversion funnel (e.g., multiple stages that end in a particular action that a user performs on a particular webpage (sometimes referred to as a conversion event)).

In such an illustrative example, a session may include one or more stages that a user progressed through until the user ended the session or a conversion event occurred. With such a website, information related to the sessions may be stored to be used by the detection system described above.

The detection system, for each stage of the conversion funnel, may calculate a typical conversion rate for one or more sessions that are determined to be similar to one or more suspect sessions. In such an example, a suspect session may be a session that is identified as having an attribute of interest (sometimes referred to as a suspect attribute). In some examples, the one or more suspect sessions may be limited to sessions that have been determined to be terminated based upon the suspect attribute (e.g., an event that occurred).

The typical conversion rate may then be compared to a suspect conversion rate to generate an under-conversion rate. The under-conversion rate may be multiplied by an average conversion value to determine an amount of money that the website is losing because of the stage based upon users abandoning their session at the stage.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIGS. 3A and 3B each illustrate an example of a stage of a suspect session according to certain embodiments described herein.

TERMS

Figure 1:
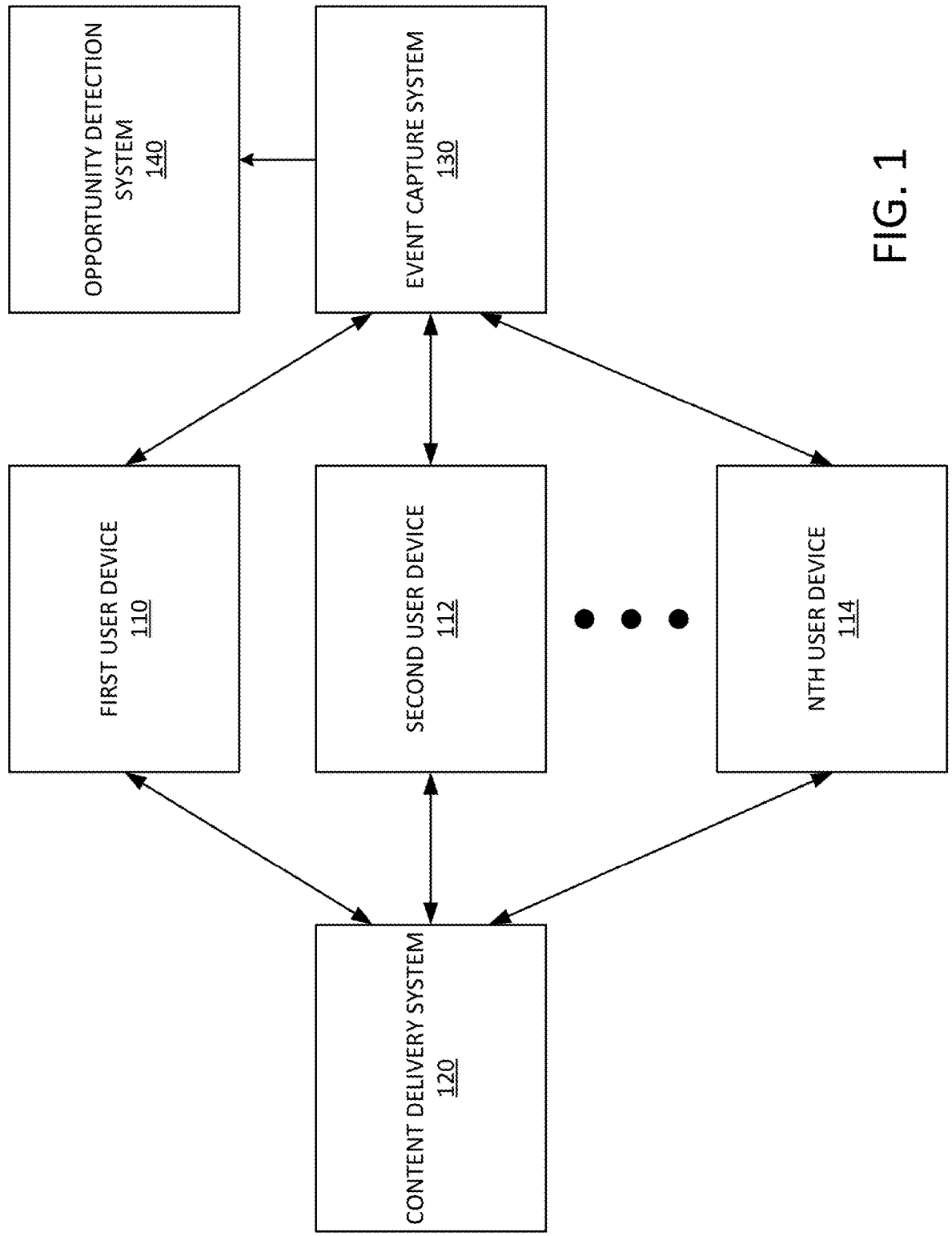
FIG. 1 illustrates an example of a distributed system for detecting opportunities to improve content delivery according to certain embodiments described herein.

Prior to further describing embodiments of the disclosure, description of related terms is provided.

A "user" can be a person or thing that employs some other thing for some purpose. A user may include an individual that uses a user device and/or a website. The user may also be referred to as a "consumer" or "customer" depending on the type of the website.

A "user device" may comprise any suitable computing device that can be used for communication. A user device may also be referred to as a "communication device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, mobile phones (e.g., cellular phones), PDAs, tablet computers, net books, laptop computers, etc. Further examples of user devices include wearable devices, such as smart watches, fitness bands, ankle bracelets, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device).

A "server computer" may include a powerful computer or cluster of computers. For example, the server computer can be a large mainframe, a minicomputer cluster, or a group of computers functioning as a unit. In some cases, the server computer may function as a web server or a database server. The server computer may include any hardware, software, other logic, or combination of the preceding for servicing the requests from one or more other computers. The term "computer system" may generally refer to a system including one or more server computers.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "session" general refers to a set of user interactions with a website. The session may include interactions starting with a user accessing a webpage of the website (e.g., using a web browser or other software application) and ending with the user ceasing interactions with the website (e.g., closing a webpage of the website within the web browser or software application). The time-length of the session in seconds, minutes, and/or hours can be determined based on a start time when the user first interacted with the website to an end time of the last interaction made by the user. The webserver hosting the website may store an identifier of the session and other information associated with the session (e.g., elements or items of the website selected by the user, or information input by the user).

A session may include one or more "stages" that a user progresses through until the user ends the session. The "stages" may be defined based on interactions made by the user (e.g., opening a webpage, selecting an element or item of the page, or inputting information in a particular location). For example, each stage may be associated with a particular interaction that beings the stage (e.g., opening a page, selecting an element, or submitting data) and a particular interaction that ends the stage (e.g., opening another page, selecting another element, or submitting other data). Each stage may be associated with one or more changes or updates to a webpage (e.g., a visual change or a change in the information obtained by the web server). For example, each webpage of the website presented to the user may correspond to a different stage. In some examples, stages may be a combination of multiple different webpages and/or different interactions with particular webpages. Each of the stages may be associated with a unique identifier.

An example of a set of stages during a session is provided below. In this example, a user opens a homepage of a website, which is associated with a first stage. During the first stage, the user browses the page and selects a link to open a second page on the website, thereby ending the first stage and beginning a second stage. The second stage can be associated with the second page. During the second stage, the user browses the second page and inputs information to the second page by selecting items or elements of the page or by inputting text into a field of the second page. This information is submitted to the web site (which can be performed automatically by the website or performed manually by the user selecting a submit button). The submission of such information can end the second stage and beginning a third stage. The third stage can be associated with a third page. The third page may present confirmation of the information selected or input by the user. Not every session with a particular web site will include the same stages nor will the stages always occur in the same order. Different sessions may include different stages and the stages may occur in different orders. And, a particular stage or sequence of stages may occur more than once in a given session. In addition, while the stages are described as being associated with a particular "webpage," the stages can be associated with particular in-line updates to blocks, fields, or elements of the same webpage (e.g., the same URL).

An "attribute" of a session refers to a characteristic, property, or parameter of the session or an event that occurred during the session. Examples of attributes that a session can have include the following: mobile device, desktop device, type of browser, browser version, operating system, geography, time of day, referrer, landing page, path taken, page viewed, length of time on website, value of the user, a user that has visited the site previously. Other examples of attributes of a session include the following: repetitive clicks from an input device, random key inputs from an input device, use of a particular feature such as a coupon, slow response time, a user repeating the same stage in a session where a majority only interact with the same stage once, a specific error message being displayed, a failed login, a JavaScript error, an operating system version, a connection speed, use of horizontal scrolling, a credit card authorization, a long running spinner, a reminder error, and a reload page.

A "conversion" or "conversion event" generally refers to a digital interaction by a user that achieves a particular result or objective. For example, a "conversion" can include a user placing an order, registering for a website, signing up for a mailing list, opening a link, or performing any other action. As such, a mere "visitor" to a website has been converted into a "user" or "consumer" of the website. The conversion process may involve one or more intermediate actions taken by the user to achieve the result of objective. For example, a conversion process for placing an order can include the intermediate steps of visiting a website, selecting one or more items, adding one or more items to an order, selecting parameters for the order, inputting order information, and submitting the order. In another example, a conversion process for a user registering with a website can include the intermediate steps visiting the website, selecting a registration link, inputting an email address, and submitting the email address.

The "performance" of a website, a webpage, or a particular stage can be based on its "conversion rate." One method for determining a "conversion rate" (e.g., conversion percentage) is to compute the percentage of visitors to a website that perform a particular "conversion event." The conversion rate can be determined for sessions having a particular attribute or a combination of attributes. An average conversion rate can be determined across a set of sessions on a website. Sessions having a certain set of attributes may have a lower conversion rate compared to the average conversion rate. Such sessions may be referred to as "suspect sessions" as further described below. An "under-conversion rate" can be determined by subtracting the conversion rate for one or more sessions to the average conversion rate. The under-conversion rate represents the number of missed conversion events (e.g., potential conversions that were abandoned). The under-conversion rate can be used to determine a "missed opportunity" or "missed opportunity value." For example, a total missed opportunity value can be determined by multiplying an average conversion value by the number missed conversions (the difference between the average conversion rate and the determined conversion rate for a particular set of sessions).

A "suspect attribute" generally refers to an attribute of a session that may hinder users from performing a particular action and may cause a user to abandon a website or terminate a web session. Examples of suspect attributes include the following: repetitive clicks from an input device, random key inputs from an input device, use of a particular feature such as a coupon, slow response time, a user repeating the same stage where a majority only interact with the same stage once, a specific error message being displayed, a failed login, a JavaScript error, a connection speed, etc. A likelihood that a particular suspect attribute was the cause of a session being abandoned can be determined for each suspect attribute. Suspect attributes can be associated with the session as a whole or with the one or more stages of the session during which they occurred.

A "suspect session" generally refers to a session having one or more suspect attributes. Suspect sessions may be defined by one or more stages entered into during the particular suspect session. The suspect session may have been abandoned by a user due to an issue such as a software bug, interface design flaw, or processing delay that arose during the session. Such issues may be defined as suspect attributes of the session.

The term "providing" may include sending, transmitting, displaying or rendering, making available, or any other suitable method. While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

DETAILED DESCRIPTION

Users of websites and software applications can experience issues such as a software bugs, interface design flaws, or processing delays that hinder them from taking certain actions (e.g., a registration process or an ordering process). In some cases, the issue may cause the user to abandon the website out of frustration. Such issues may not be able to be identified by the webserver hosting the website because the issues arise out of the generating and rendering of the webpage by the user's browser or by the execution of embedded code or API calls by the user's browser. Accordingly, some prior methods for identifying issues in websites and software applications rely on user feedback. The users that provide feedback may not have the technical knowledge to explain the details of the issue they experienced. Furthermore, such feedback is based on human memory which can be unreliable. While user feedback may identify high-level issues (e.g., the website is slow or certain functionality does not work), it is not an accurate way to specifically identify the cause of the issue. Moreover, user feedback may not be able to differentiate between issues that merely hinder a user from completing a particular action and issues that are severe enough to cause a user to abandon the website without completing the action. That is, while user feedback may identify webpages or website functionality that doesn't work as intended, it may not be able to identify which of these issues actually cause users to abandon the website.

Other prior methods for identifying issues in websites and software applications rely on user activity monitoring across the entire website. For example, the percentage of website visitors that take a particular action (e.g., registering for the website or placing an order) can be compared to the average percentage of visitors that perform the same action on similar websites. While activity monitoring can determine that users are experience issues causing them to abandon the website, it does not specifically identify which attributes or elements of particular webpages are causing the issue for the website.

Other prior methods can use software debugging tools to identify errors being thrown by the client-side execution of code to generate the website. However, debugging tools may identify numerous different software errors occurring during the session (e.g., tens or hundreds of errors). Typically, errors occur during sessions that were not abandoned. It may not be possible for a software programmer to analyze hundreds of different errors to determine which errors do or do not cause users to abandon their session.

The embodiments disclosed herein provide improved systems and methods to identify attributes or elements in webpages that cause users to abandon the website, thereby enabling improved user interface design, improved software debugging, and improved website operation. The improved systems and methods include identifying a plurality of suspect sessions having certain suspect attributes. Other non-suspect sessions also having a common session attribute are identified and are used to identify an under-conversion rate for the particular stage. The under-conversion rates for the stages can be used to identify whether the suspect attribute is causing users to abandon the website.

Thus, while prior methods can identify whether a website is underperforming, the improved systems and methods described herein can identify the particular suspect attribute (e.g., actions indicating an error) within the session that are not just hindering users, but that are causing users to abandon the website without completing a particular action. By accurately identifying the suspect attributes causing abandonment, the corresponding embedded code, API calls, and user interface functionality can also be identified. Accordingly, web programmers are able to accurately identify the code causing the errors and perform debugging to improve the website design and operation.

Prior systems may not be able to accurate identify which particular suspect attributes lead to abandonment. For example, a website may use "cookies" (e.g., a file stored on a user's computer containing information associated with the website) having a relatively large size. If the user's web browser implements a total size restriction on cookies, then other cookies may be deleted to make room, which can lose progress made by the user and cause them to abandon the session. For example, if a user's cart information is saved in a cookie and that cookie is deleted due to size restrictions, the user may abandon their session if they do not want to go back and refill their cart again. Typical users are not aware of cookie handling and they may not be able to identify the large cookie size as the issue. Furthermore, even if the deletion of a cookie is part of an error log, it may be one of hundreds or thousands of log-records stored for a particular session. A software debugger analyzing the log may not practically be able to identify the large cookie as an error. Therefore, prior debugging systems such as user feedback and log analysis may not be able to identify the problem. However, the embodiments disclosed herein improve upon the prior methods because they can determine that the large cookie causing other cookies to be deleted is correlated to users abandoning a session by determining that suspect sessions (e.g., sessions where the large cookie was used and other cookies were deleted) have a lower conversion rate for particular stages (e.g., a "review cart" or "checkout" stage) compared to other non-suspect sessions where the large cookie did not cause other cookies to be deleted.

The improved systems and methods for identifying errors in websites can be implemented by a detection system. The detection system can obtain session information for each of a plurality of previous sessions on the website. This session information can be provided by a capture system that captures the session information from user devices. The session information for a particular previous session includes session attributes of the previous session (e.g., the OS used, the browser used, etc.). The session information also includes one or more events that occurred during the previous session (e.g., function calls, errors thrown, etc.). Each previous session is associated with one or more stages of the website entered into during that previous session. The stages can be associated with a particular webpage (e.g., a cart page, a checkout page, a customer information form, etc.). The stages can also be associated with changes to a particular website (e.g., if website uses embedded client-side code to change the document object model of the webpage). The detection system can also obtain a set of suspect attributes (e.g., issues or errors occurring on the website). Each suspect attribute of the set of suspect attributes is associated with one or more events indicating a particular technical error on the website (e.g., a particular java script error can be associated with a suspect attribute).

For each suspect attribute in the set of suspect attributes, the detection system can identify a plurality of suspect sessions from the plurality of previous sessions. The previous sessions are determined to be suspect sessions because they include the one or more events associated with the suspect attribute. The detection system then determine a set of stages associated with the suspect sessions. Each stage in the set of stages is associated with at least one of the plurality of suspect sessions. However, not all suspect sessions include the same stages, the same number of stages, or the same ordering of stages (e.g., because users may click different links and take different paths while visiting a website). For instance, the plurality of suspect sessions include a first suspect session and a second suspect session where the first suspect session includes stages that are not included in the second suspect session.

After determining the stages, the detection system computes a suspect conversion rate for each stage in the set of stages based on the plurality of suspect sessions. The suspect conversion rate can be determined by dividing the number of sessions that progress past the stage (e.g., a conversion) by the total number of sessions including that stage. The suspect conversion rate can be computed based upon a total number of the plurality of suspect sessions associated with the set of stages and a number of the suspect sessions associated with the set of stages that included an action defined as a conversion. The detection system can also determine a common session attribute of the plurality of suspect sessions (e.g., all of the sessions used a particular operating system, or a particular web browser, etc.). The common session attribute is identified based on at least a threshold number of the plurality of suspect sessions having the common session attribute. The detection system then identifies a plurality of non-suspect sessions having the common session attribute. The plurality of non-suspect sessions do not include the one or more events associated with the suspect attribute. That is, the non-suspect sessions did not encounter the same error or issue that were encountered in the suspect sessions. Thus, the non-suspect sessions are not included in the plurality of suspect sessions.

After identifying the non-suspect sessions, the detection system computes an expected conversion rate for each stage in the set of stages based on the plurality of non-suspect sessions. The expected conversion rate is the percent of users that progress past the particular stage when the issue or error is not encountered. The expected conversion rate can be computed based upon a total number of the plurality of non-suspect sessions and a number of the plurality of non-suspect sessions that included an action defined as a conversion. The expected conversion rate can computed using sessions occurring on the website overall, where the plurality of suspect sessions are associated with the website.

The detection system then computes an under-conversion rate for each stage in the set of stages based upon the suspect conversion rate for the stage and the expected conversion rate for the stage. The under-conversion rate can be the difference between the expected conversion rate and the suspect conversion rate. The detection system can then determine whether the suspect attribute is correlated with the suspect sessions being abandoned (e.g., using a predefined threshold). After determining the under-conversion rate, the detection system can present (e.g., via a user interface) one or more suspect attributes that are correlated with the suspect sessions being abandoned to a user. As such, the user may determine whether the technical error indicated by the suspect attribute is causing the suspect sessions to be abandoned.

The detection system can also determine a drop-off value for each stage in the set of stages. The drop-off value is the number of the plurality of suspect sessions that terminated in the stage. The detection system can also compute a missed-conversion value for each stage in the set of stages. The missed-conversion value can be computed based upon an average conversion value, the under-conversion rate, and the drop-off value. Then, the detection system can present the missed-conversion value to the user (e.g., via the user interface) so that the user may identify whether a webpage corresponding to the stage includes a technical error. The average conversion value can be calculated based upon an average value for suspect sessions that ended at the stage. The average conversion value can also be calculated based upon an average value for suspect sessions that converted. The detection system can further identify an underperforming stage based upon the missed-conversion value exceeding a threshold. An identification of the underperforming stage and information related the underperforming stage can also be presented with the missed-conversion value.

The detection system can also present a replay of a suspect session with a timeline having indicators of events associated with the suspect attributes that are correlated with the suspect sessions being abandoned.

Further details of the detection system as described below with respect to the Figures.

I. High-Level Architecture for Detection System

FIG. 1 illustrates an example of a distributed system for detecting opportunities to improve content delivery according to certain embodiments described herein. The distributed system is not intended to suggest any limitation as to scope of use or functionality of described embodiments.

The distributed system may include one or more user devices, such as first user device 110, second user device 112, and nth user device 114. Each of the one or more user devices may be operated by a different user. For example, a user may be using an application for presenting content on a user device. The application may be a browser for presenting content from many different sources using uniform resource locators (URLs) to navigate to the different sources or an application associated with a defined number of one or more sources (e.g., an enterprise application for content associated with an enterprise).

The distributed system may further include content delivery system 120. Content delivery system 120 may be implemented to store content, such as electronic documents (e.g., a collection of web documents for a website). In one illustrative example, content delivery system 120 may be a web server that hosts a website by delivering the content.

The one or more user devices (e.g., first user device 110, second user device 112, and nth user device 114) may communicate with content delivery system 120 to exchange data via one or more communication networks. Examples of a communication network include, without restriction, the Internet, a wide area network (WAN), a local area network (LAN), an Ethernet network, a public or private network, a wired network, a wireless network, and the like, and combinations thereof.

In one illustrative example, first user device 110 may exchange data with content delivery system 120 to send instructions to and receive content from content delivery system 120. For example, a user device may send a request for a webpage to content delivery system 120. The request may be sent in response to a browser executing on the user device navigating to a uniform resource locator (URL) associated with content delivery system 120. In other examples, the request may be sent by an application executing on the user device.

In response to the request, content delivery system 120 may provide the webpage (or a document to implement the webpage, such as a Hypertext Markup Language (HTML) document) to the user device. In some examples, the response may be transmitted to the user device via one or more data packets.

While the above description relates primarily to providing webpages, it should be recognized that communications between user devices and content delivery system 120 may include any type of content, including data processed, stored, used, or communicated by an application or a service. For example, content may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. A BLOB may include a collection of binary data stored as a single entity in a database management system, such as an image, multimedia object, or executable code, or as otherwise known in the art. For another example, content may include an extended markup language (XML) file, a JavaScript files, a configuration file, a visual asset, a media asset, a content item, etc., or a combination thereof.

The distributed system may further include event capture system 130 to capture, store, provide, and regenerate events that occur on user devices. For example, a user device may display a webpage. In such an example, event capture system 130 may capture one or more interactions with the webpage that occur on the user device, such as movement of a mouse cursor, activation of a user-selectable option, or the like. As illustrated in FIG. 1, event capture system 130 may be communicatively coupled (e.g., via one or more networks) to each of one or more user devices. For example, event capture system 130 may be communicatively coupled to first user device 110. In some examples, instead of being separate from the user devices, an instance (not illustrated) of event capture system 130 may be executing on each of the user devices. In such examples, an additional portion of event capture system 130 may be separate from each of the user devices, where the additional portion communicates with each instance. In addition or in the alternative, event capture system 130 may be communicatively coupled to content delivery system 120 via a communication connection.

The distributed system may further include detection system 140 to receive events from event capture system 130. Using the received events, detection system 140 may determine opportunities to improve content delivery system 120. For example, based upon multiple events, detection system 140 may identify particular content or a particular portion of the particular content that underperforms as compared to other content similar to the particular content, as further described below. While detection system 140 is shown as a separate system, it should be recognized that detection system 140 may be included with event capture system 130 or a user device.

Each of first user device 110, second user device 112, nth user device 114, content delivery system 120, event capture system 130, and/or detection system 140 may include one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Each of first user device 110, second user device 112, nth user device 114, content delivery system 120, event capture system 130, and/or detection system 140 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like.

Each of first user device 110, second user device 112, nth user device 114, content delivery system 120, event capture system 130, and/or detection system 140 may be implemented using hardware, firmware, software, or combinations thereof. In various embodiments, each of first user device 110, second user device 112, nth user device 114, content delivery system 120, event capture system 130, and/or detection system 140 may be configured to run one or more services or software applications described herein. In some embodiments, content delivery system 120, event capture system 130, and/or detection system 140 may be implemented as a cloud computing system.

Each of first user device 110, second user device 112, nth user device 114, content delivery system 120, event capture system 130, and/or detection system 140 may include several subsystems and/or modules, including some, which may not be shown. Subsystems and/or modules of each of first user device 110, second user device 112, nth user device 114, content delivery system 120, event capture system 130, and/or detection system 140 may be implemented in software (e.g., program code, instructions executable by a processor), in firmware, in hardware, or combinations thereof. The subsystems and/or modules of each of first user device 110, second user device 112, nth user device 114, content delivery system 120, event capture system 130, and/or detection system 140 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein.

Each of first user device 110, second user device 112, nth user device 114, content delivery system 120, event capture system 130, and/or detection system 140 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Each of first user device 110, second user device 112, nth user device 114, content delivery system 120, event capture system 130, and/or detection system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof.

Each of first user device 110, second user device 112, nth user device 114, content delivery system 120, event capture system 130, and/or detection system 140 may provide some services and/or applications that are in a virtual or non-virtual computing environment. Such services may be offered on-demand to user devices. In some embodiments, a specific instantiation of a service provided by detection system 140 may be referred to herein as a "service." A user operating a user device may use one or more applications to interact and utilize the services or applications provided by content delivery system 120, event capture system 130, and/or detection system 140. Services may be offered as a self-service or a subscription. Users may acquire the application services without the need for customers to purchase separate licenses and support. Examples of services may include a service provided under a Software as a Service (SaaS) model, a web-based service, a cloud-based service, or some other service provided to a user device. In some embodiments, event capture system 130 and/or detection system 140 may host an application to interact with an application executing on a user device on demand. A user operating a user device may in turn utilize one or more applications to interact with content delivery system 120, event capture system 130, and/or detection system 140 to perform operations described herein.

In some examples, a service may be an application service provided by content delivery system 120, event capture system 130, and/or detection system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications. The cloud computing system may be implemented as a cloud-based infrastructure that is accessible via one or more networks. Various different SaaS services may be provided.

A user device may include or be coupled to a display. A user device may provide access to one or more applications (also referred to herein as an "application program"). An application of the one or more applications may present content using the display. It should be recognized that an application may be executing on a user device, content delivery system 120, event capture system 130, detection system 140, or a combination thereof. In some embodiments, an application may be accessed from one location and executed at a different location. For example, an application may be accessible at a user device as a service, but the application may be executing at detection system 140. An application may include information such as computer-executable or machine-executable instructions, code, or other computer-readable information. The information may be written in any suitable programming language to perform the various operations, functions, methods, and/or processes disclosed herein. The information may be configured for operation of the application as a program. Examples of applications may include, without restriction, a document browser, a web browser, a media application, or other types of applications.

In some embodiments, an application may be device specific. For example, the application may be developed as a native application for access on a particular device that has a configuration that supports the application. The application may be configured for a particular type of platform and/or particular type of device. As such, the application may be implemented for different types of devices. Devices may be different for a variety of factors, including manufacturer, hardware, supported operating system, or the like. The application may be written in different languages, each supported by a different type of device and/or a different type of platform for the device. For example, the application may be a mobile application or mobile native application that is configured for use on a particular mobile device.

In some embodiments, an application may generate a view of information, content, and/or resources, such as documents. For example, the application may display content to view on a user device. The view may be rendered based on one or more models. For example, a document may be rendered in the application, such as a web browser using a document object model (DOM). The view may be generated as an interface, e.g., a graphical user interface (GUI), based on a model. The document may be rendered in a view according to a format, e.g., a hypertext markup language (HTML) format. The interface for the view may be based on a structure or organization, such as a view hierarchy.

Event capture system 130 may capture or record content presented by a user device. For example, the content may be a view of a document. Such content may be received from content delivery system 120. A view may be generated for display in the application based upon content obtained from content delivery system 120. In some embodiments, the application is a native application, written using a language readable by device to render a resource, e.g., a document, in the application. The view in the application may change rapidly due to one or more interactions with the application.

As described above, event capture system 130 may be implemented at least partially on a user device (e.g., client-side) where views are to be captured. In such embodiments, event capture system 130 may be implemented in a variety of ways on the user device. For example, event capture system 130 may be implemented as instructions accessible in a library configured on the user device. Event capture system 130 may be implemented in firmware, hardware, software, or a combination thereof. Event capture system 130 may provide a platform or an interface (e.g., an application programming interface) for an application to invoke event capture system 130 or for event capture system 130 to monitor operations performed by a user device. In some embodiments, event capture system 130 may be an application (e.g., an agent) residing on a user device. Event capture system 130 may be implemented using code or instructions (e.g., JavaScript) embedded in an application.

An application for which views are to be captured may be implemented to include all or some instructions of event capture system 130. In such examples, event capture system 130 may be implemented for different types of devices and/or different types of platforms on devices. For example, event capture system 130 may be configured specific to a platform on a device so as to utilize specific functions of the platform to capture views in an application. In one example, an application may be configured to have instructions that are invoked in different scenarios to call event capture system 130. The application may include a capture management platform to invoke event capture system 130. In another example, the capture management platform may be embedded in the application. In some embodiments, the application may be implemented with instructions that invoke event capture system 130 through a platform or interface provided by event capture system 130. For example, different functions for generating views in an application may be configured to call event capture system 130. Event capture system 130 may monitor a view based on the call from the application, and then event capture system 130 may perform or invoke the original function(s) that were initially called by the application.

Alternatively, or additionally, event capture system 130 may listen for notifications by a particular application that is to be monitored. Event capture system 130 may utilize feature of a platform or a user device to listen for notifications, such as notifications provided about applications by an operating system on the user device. The notifications may be configured for a particular application. Based on the notifications, event capture system 130 may determine a view in an application, and whether the view has changed. In some embodiments, event capture system 130 may intercept a call from the application to modify or change a view. The call may be intercepted based on a notification about an event related to the change in view. Event capture system 130 may determine information about the view based on the call, and then proceed with invoking the original call that was detected.

Event capture system 130 may monitor interactions with an application or content in the application to determine a change in the view. For example, event capture system 130 may determine when an interactive element (e.g., a field) changes and/or when a new view (e.g., an interface) or the existing view is presented. Event capture system 130 may also determine events associated with presenting a view in the application. The events may be determined using a model associated with displaying content, e.g., a document, in the application. The events may be identified by a node or other information in the model associated with the view. Examples of events include, without restriction, an interaction with the application or a change in a document displayed in the application.

Event capture system 130 may be implemented in different ways to capture the view in an application. Event capture system 130 may monitor a view to determine an organization of the view. The view may be monitored according to a variety of techniques disclosed herein. The view may be monitored to determine any changes in the view. The view may be monitored to determine the view, such as a view hierarchy of the view in the application, a layout of the view, a structure of the view, one or more display attributes of the view, content of the view, lines in the view, or layer attributes in the view. Monitoring a view may include determining whether the view is created, loaded, rendered, modified, deleted, updated, and/or removed. Monitoring a view may include determining whether one or more views (e.g., windows) are added to the view.

Event capture system 130 may generate data that defines a view presented by an application. Event capture system 130 may generate the view as a layout or page representation of the view. Data may describe or indicate the view. The data may be generated in a format (e.g., HTML) that is different from a format in which the view in the application is written. For example, for multiple applications that are similar, but configured for different native environments, the view from each of the applications may be translated by event capture system 130 into data having a single format, e.g., HTML. The language may have a format that is different from a format of the language in which the view is generated in the application. The language may be generic or commonly used such that a computer system can process the data without a dependency on a particular language. Based on the information determined from monitoring a view at a user device, event capture system 130 may generate the data having a structure and the content according to the structure as it was displayed at the user device. For example, the data may be generated in HTML and may have a structure (e.g., a layout and/or an order) as to how content was seen in a view, such as headers, titles, bodies of content, etc. In some embodiments that data may be generated in the form of an electronic document for one or more views. The data may be generated to include attributes defining the view such as display attributes of the content. The data may be generated to include the content that was visibly seen in the view according to the structure of the view. In some embodiments, data may be generated for each distinct view identified in the application.

The generated data may be used to recreate a view at a document. The techniques disclosed herein may be used to recreate the view in the application. As disclosed herein, some content may change minimally between documents. With regard to applications, some views may change in a limited amount.

In some embodiments, event capture system 130 may generate data based on a model defining the view captured in an application. The model may be defined based on attributes identified in the view. The model may be a copy, or duplicate (e.g., a shadow) of a model for the view in the application. For example, event capture system 130 may generate a shadow document object model (DOM) for a DOM that is identified for a view in the application.

Event capture system 130 may implement techniques for compact data storage and efficient search thereof of the views that are determined from monitoring applications. Data may be generated for one or more views in an application. The data may be generated in a format of a resource, such as an electronic document. The techniques disclosed herein may be implemented for compact storage of documents that are generated. Using such techniques, event capture system 130 may determine the differences between documents representing views, to determine which, if any, have changed and what those changes are. The differences may be stored and easily retrieved using techniques disclosed herein. In some embodiments, the techniques performed at a server, can be performed by event capture system 130, in particular a storage management module. Data that is generated and managed by event capture system 130 may be stored in a capture management store. When translating a view from multiple applications, which are similar, but configured differently for different native environments on devices, similar or identical views can be stored as a single instance and the differences can be stored separately. Techniques disclosed herein can be used to identify/compare differences between views generated by similar applications configured for different native environments.

In some embodiments, event capture system 130 may implement techniques herein for document capture using client-based delta encoding with a server. The techniques disclosed herein can be implemented for document capture based on the documents generated by capturing a view in an application. Techniques disclosed herein can be used to identify/detect differences between views generated by similar applications configured for different native environments.

II. Techniques for Detection System

For years, identifying where customers struggle online has relied on customer feedback and overall conversion monitoring. As digital interaction increasingly becomes the primary interaction of customers and enterprises, and as digital users increase their expectation of having perfect online experiences, website operators are in need of faster time to identify website issues.

Organizations are more actively searching for customer struggle as friction free websites are becoming competitive advantages. Instead of hiring an army of analysts to identify where opportunities to improve exist, an automated detection system can help improve response time to issues, improve brand and customer experiences, and increase digital revenue.

Techniques are described herein for analyzing suspect sessions to determine if one or more stages associated with the suspect sessions are underperforming compared to corresponding stages associated with similar sessions. In some examples, such techniques may quantify conversion impact of underperforming segments of suspect segments. The quantification may occur by correlating goal analysis of suspect segments against a similarly composed segment that excludes the suspect attribute that composes the suspect segment.

In some embodiments, an detection system (e.g., detection system 150 in FIG. 1) may be provided. The detection system may provide a user interface that allows a user to select one or more attributes (referred to as suspect attributes) that may be associated with one or more sessions. Selection of the one or more attributes may identify multiple sessions (referred to as suspect sessions herein). The one or more suspect sessions may be analyzed to determine whether one or more stages associated with the one or more suspect sessions are underperforming compared to corresponding stages associated with one or more other sessions determined to be similar to the one or more suspect sessions.

In one illustrative example, a website may present one or more webpages to a user, each webpage (and/or change in a webpage) representing a different stage in a conversion funnel (e.g., multiple stages that end in a particular action that a user performs on a particular webpage (sometimes referred to as a conversion event)).

In such an illustrative example, a session may include one or more stages that a user progressed through until the user ended the session or a conversion event occurred. With such a website, information related to the sessions may be stored to be used by the detection system described above.

The detection system, for each stage of the conversion funnel, may calculate a typical conversion rate for one or more sessions that are determined to be similar to one or more suspect sessions. In such an example, a suspect session may be a session that is identified as having an attribute of interest (sometimes referred to as a suspect attribute). In some examples, the one or more suspect sessions may be limited to sessions that have been determined to be terminated based upon the suspect attribute (e.g., an event that occurred).

The typical conversion rate may then be compared to a suspect conversion rate to generate an under-conversion rate. The under-conversion rate may be multiplied by an average conversion value multiplied by the size of the affected segment to determine an amount of money that the website is losing because of the stage based upon users abandoning their session at the stage.

Figure 2:
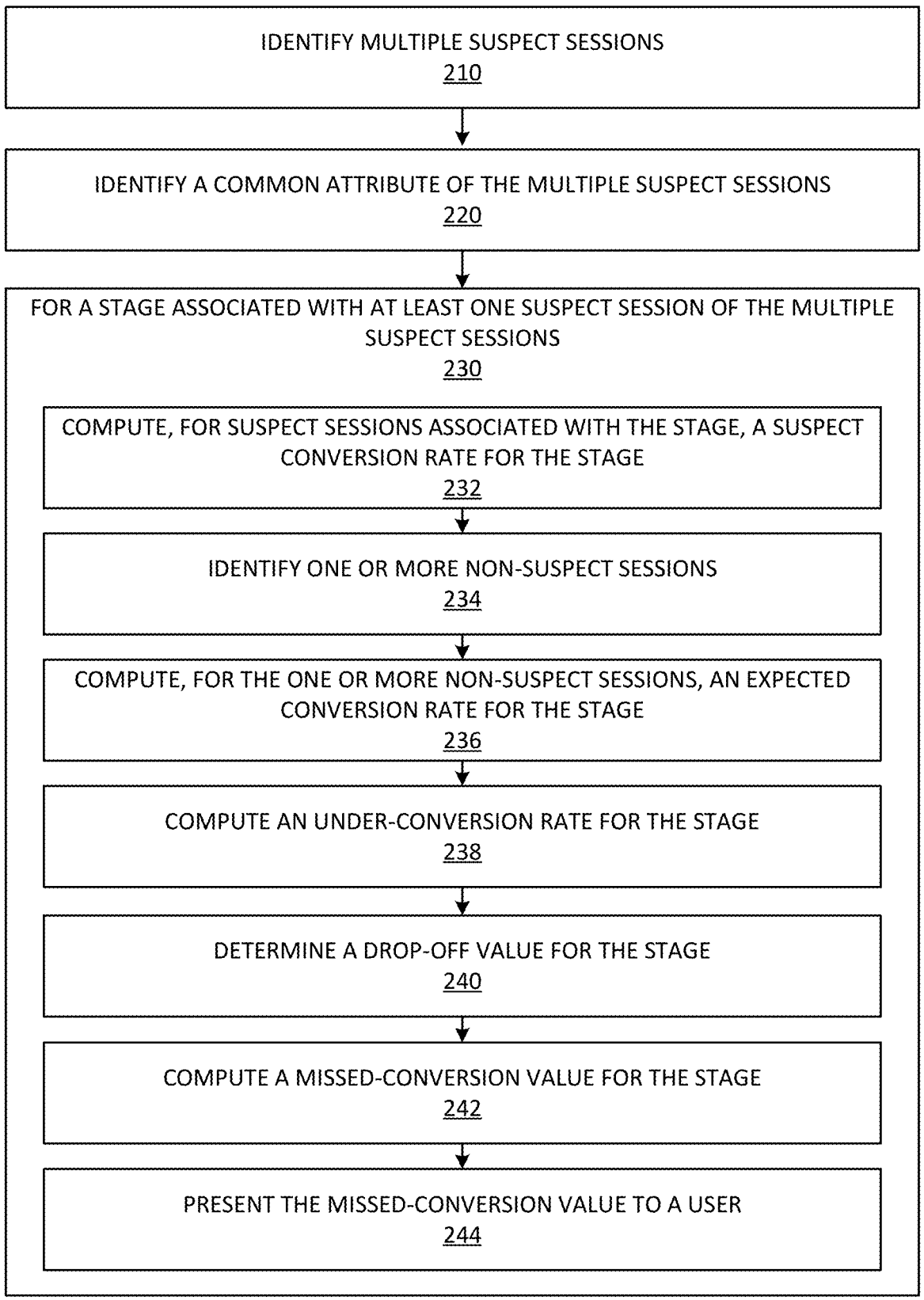
FIG. 2 is a flowchart depicting processing performed for error detection according to certain embodiments described herein.

FIG. 2 is a flowchart depicting processing performed for error detection according to certain embodiments described herein. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel.

In the embodiment depicted in FIG. 2, the processing may be triggered at 210 when an detection system (e.g., detection system 140 in FIG. 1) identifies multiple suspect sessions. Sessions can be identified as suspect sessions based on their including of suspect attributes. Suspect attributes are characteristics or events occurring in the session that may hinder users from performing a particular action and may cause a user to abandon a website or terminate a web session. Suspect attributes can include repetitive clicks from an input device (e.g., keyboard or touch screen), random key inputs from an input device, use of a particular feature such as a coupon, slow response time, a user repeating the same stage where a majority only interact with the same stage once, a specific error message being displayed, a failed login, a JavaScript error, or a connection speed.

Each suspect session may be defined by one or more stages entered into during the suspect session. While different suspect sessions may have a different number of stages, each session of the multiple suspect sessions may be related to a particular flow of stages (e.g., each of the multiple suspect sessions may include at least one common stage). In some examples, the suspect session may represent a progression of a user on a website (e.g., though the stages of the session). For example, each webpage of the website presented to the user may correspond to a different stage. For another example, each set of one or more interactions of a user with a webpage may correspond to a different stage. In some examples, stages may be a combination of different webpages and different interactions with particular webpages. For example, each stage may be associated with a particular interaction that beings the stage (e.g., opening a page, selecting an element, or submitting data) and a particular interaction that ends the stage (e.g., opening another page, selecting another element, or submitting other data).

Figure 3A:
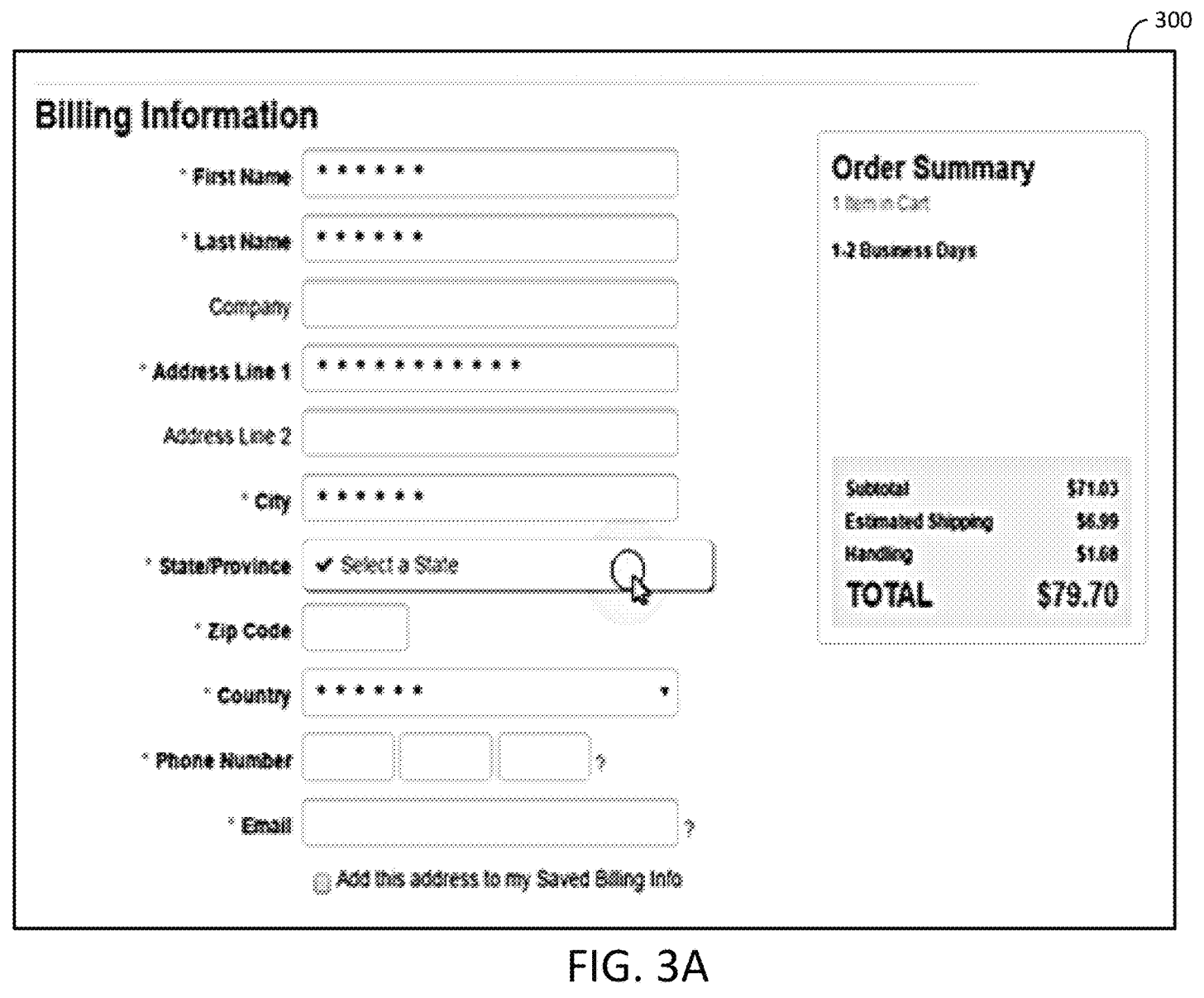
Figure 3B:

FIGS. 3A-3B each illustrate an example of a stage of a suspect session according to certain embodiments described herein. The example depicted in FIG. 3A illustrates a webpage for entering billing information. As can be seen, a user is able to enter information into multiple boxes. For the state/province box, it can be seen that a mouse cursor is attempting to click on a user-selectable option for viewing a list of states/provinces. In this example, the user-selectable option might not be responding to selections (e.g., the user may attempt to select the user-selectable option multiple times in quick succession). Such an error may result in an error message to be produced that indicates the user-selectable option became unresponsive. The error message may then be a suspect attribute, as described above. At some point after the error, the user may leave a website associated with the webpage, causing a session to be stored from a first webpage (where the user entered the website) to whatever webpage the user last visited before leaving the website.

In some examples, the webpage depicted in FIG. 3A may correspond to the stage, including any interactions with the webpage. In other examples, the interactions related to the user-selectable option may correspond to the stage such that interactions related to other portions of the webpage may correspond to other stages.

The example depicted in FIG. 3B again illustrates the webpage described in FIG. 3A for entering billing information. As can be seen, the state/province box appears to be working in this example. In this example, the user has received an error regarding their email address. In particular, the user may have attempted to enter their email but is receiving an error. The error may result in an error message to be produced that indicates the email is incorrect. The error message may then be a suspect attribute, as described above. At some point after the error, the user may leave a website associated with the webpage, causing a session to be stored from a first webpage (where the user entered the website) to whatever webpage the user last visited before leaving the website. In another example, the user may input a correct email address but receive the error message indicating that their email is incorrect. The user may become frustrated and input other words (e.g., gibberish or profanity) into the text box. Such text entry may also be a suspect attribute.

In some examples, the webpage depicted in FIG. 3B may correspond to the stage, including any interactions with the webpage. In other examples, the interactions related to entering the email may correspond to the stage such that interactions related to other portions of the webpage may correspond to other stages.

Referring back to FIG. 1, the multiple suspect sessions may be identified based upon a session having a suspect attribute. Examples of a suspect attribute include repetitive clicks from an input device, random key inputs from an input device, use of a particular feature such as a coupon, slow response time, a user repeating the same stage where a majority only interact with the same stage once, a specific error message being displayed, a failed login, a JavaScript error, a browser type, a browser version, a os version, a connection speed, a location, a landing page, a referrer, amongst others, or the like.

For exemplary purposes, a suspect session may be identified according to the teachings of U.S. Non-Provisional patent application Ser. No. 15/671,530 filed on Aug. 8, 2017, entitled "TECHNIQUES FOR MONITORING USER INTERACTIONS AND OPERATION OF A WEBSITE TO DETECT FRUSTRATION EVENTS," the disclosure of which is hereby incorporated by reference in its entirety for all purposes. As described therein, a detection system can monitor operations and/or interactions with a website to detect events that affect the performance of a website and/or contribute to the frustration of user interacting with the website. Such interactions and operations may be monitored with respect to a policy that defines threshold for monitoring different types of events. The events can be defined based on one or more criteria, such as time. The detection system can determine that one or more thresholds defining an event are satisfied. For example, the detection system may determine whether the thresholds are satisfied within a time period defining the event (e.g., a number of mouse clicks within a time period, or a number of DOM changes on a webpage). Based on determining that an event is detected, event data may be generated for the event. The event data may include information about a session of access to the website, a location of documents accessed (e.g., URL), information about the interactions (e.g., where, when, and how), and information about the operations. The event data may be displayed and/or communicated to another computer system. For example, the event data may be sent to a computer system that is hosting the website to enable the computer system to adjust operation based on the event data.

Examples of "frustration events," which may be "suspect attributes," include the following: a user "rage clicking" determined based on a number of clicks on a document within a time period, Application Programming Interface (API) errors, an error in execution of embedded code, a user may type profanity into an interactive element, a user repeating steps or a series of steps.

The identification of the suspect attribute and the identification of the multiple suspect sessions may be performed by different components. For example, the detection system may receive events from an event capture system (e.g., event capture system 130). The events may be either grouped into sessions by the event capture system or by the detection system. The detection system may then identify the multiple suspect sessions from the aggregate list of sessions.

For another example, the multiple suspect sessions may be received by the detection system already grouped into sessions and identified as suspect sessions. In this way, the event capture system 130 may be the entity that groups events into sessions and originally identified a session as being suspect.

In some embodiments, for each suspect session of the multiple suspect sessions, the detection system may determine a likelihood that the suspect attribute is the cause of the suspect session being abandoned by a user (e.g., not reaching a conversion event). If the determined likelihood for a suspect session is over a threshold, it may be determined that the suspect attribute caused the suspect session to be abandoned. While it should be recognized that there are many ways to determine whether the suspect attribute is the cause of abandonment, the determining may use an indicator such as whether the suspect attribute occurred near the end of a session (e.g., the last 2%, 5%, 10%, 20% of the session, the last 30 seconds, the last minute, the last 2 minutes, or the like). In particular, suspect attributes arising in the last 2 minutes of a session are likely to have been the cause of abandonment. In the alternative, the determining may use an indicator such as whether a particular user returns multiple times and incurs same issue multiple times.

In some examples, multiple indicators may be used such that a likelihood percentage may be computed based upon the number of positive and negative indicators. The likelihood percentage may indicate a likelihood that a suspect attribute caused a suspect session to end. In such examples, if the likelihood percentage is above a threshold (e.g., 40%, 50%, 60%, or the like), the suspect session may be determined to have ended because of the suspect attribute. In some embodiments, users involved in sessions determined to have ended because of the suspect attribute may be messaged regarding their use of the website to help them complete a particular action.

In some examples, a percentage of suspect sessions in the multiple suspect sessions that are determined to have been abandoned because of the suspect attribute may be computed. If the percentage is above a threshold (e.g., 40%, 50%, 60%, or the like), the multiple suspect sessions may be used going forward in the process depicted in FIG. 2. In other examples, only suspect sessions of the multiple suspect sessions that are determined to have been abandoned because of the suspect attribute may be used going forward in the process depicted in FIG. 2. In such examples, if it is determined that the suspect attribute did not cause the suspect session to be abandoned, the suspect sessions may not be used (e.g., they are removed from the set of suspect sessions) going forward in the process depicted in FIG. 2.

At 220, the detection system may identify one or more common session attributes of the multiple suspect sessions. In some examples, the one or more common session attributes are selected based upon being included in at least a threshold of the multiple suspect sessions. For example, if the multiple suspect sessions is made up of at least 80% mobile device users, a common session attribute may be the attribute of mobile device users. Different thresholds may be used for different attributes. The one or more common session attributes may be different than the suspect attribute so that similar sessions to the multiple suspect sessions may be identified for comparison purposes. Examples of a common session attribute may include mobile device, desktop device, type of browser, browser version, operating system, geography, time of day, referrer, landing page, path taken, page viewed, length of time on website, value of the user, a user has visited the site previously, or any attribute of a session.

At 230, the detection system may perform a set of one or more operations for each stage associated with at least one suspect session of the multiple suspect sessions. At 232, the set of one or more operations may include computing, for suspect sessions associated with a stage, a suspect conversion rate for the stage. The suspect conversion rate may be computed based upon a number of the multiple suspect sessions associated with the stage and a number of the suspect sessions associated with the stage that included a conversion event (e.g., an action defined as a conversion). For example, the number of the multiple suspect sessions associated with the stage may be divided by the number of the suspect sessions associated with the stage that included a conversion event.

At 234, the set of one or more operations may further include identifying one or more non-suspect sessions. The one or more non-suspect sessions may each have the one or more common session attributes and not be included in the plurality of suspect sessions (e.g., the one or more non-suspect sessions may not have the suspect attribute).

At 236, the set of one or more operations may further include computing, for the one or more non-suspect sessions, an expected conversion rate for the stage. The expected conversion rate may be computed based upon a number of the one or more non-suspect sessions and a number of the one or more non-suspect sessions that included a conversion event. For example, the number of the one or more non-suspect sessions may be divided by the number of the one or more non-suspect sessions that included a conversion event.

At 238, the set of one or more operations may further include computing an under-conversion rate for the stage. The under-conversion rate is computed based upon the suspect conversion rate and the expected conversion rate. For example, the under-conversion rate may be the absolute value of the suspect conversion rate subtracted by the expected conversion rate.

At 240, the set of one or more operations may further include determining a drop-off value for the stage. The drop-off value may include a number of the plurality of suspect sessions that terminated in the stage.

At 242, the set of one or more operations may further include computing a missed-conversion value for the stage. The missed-conversion value may be computed based upon an average conversion value, the under-conversion rate, and the drop-off value. For example, the average conversion value, the under-conversion rate, and the drop-off value may all be multiplied by each other. In some examples, the average conversion value may be calculated based upon an average cart value for suspect sessions that ended at the stage. In other examples, the average conversion value may be calculated based upon an average purchase value for suspect sessions that converted.

At 244, the set of one or more operations may further include presenting the missed-conversion value to a user so that the user may identify whether a webpage of the website corresponding to the stage includes an error. In some embodiments, the user in this context is not a user associated with a user device but rather an administrator of the website. By having this information, the administrator may determine a webpage (or a portion of a webpage) that needs to be improved. While some of the disclosure above uses terms such as "error," it should be recognized that underperformance might not be due to an error but rather a design decision. In cases that the underperformance is due to a design decision, the missed-conversion value may lead the administrator to know which design decisions are not working and where the administrator may improve the website.

III. Exemplary User Interfaces for Detection System

The following section describes user interfaces that may be produced according to certain embodiments described herein.

Figure 4:
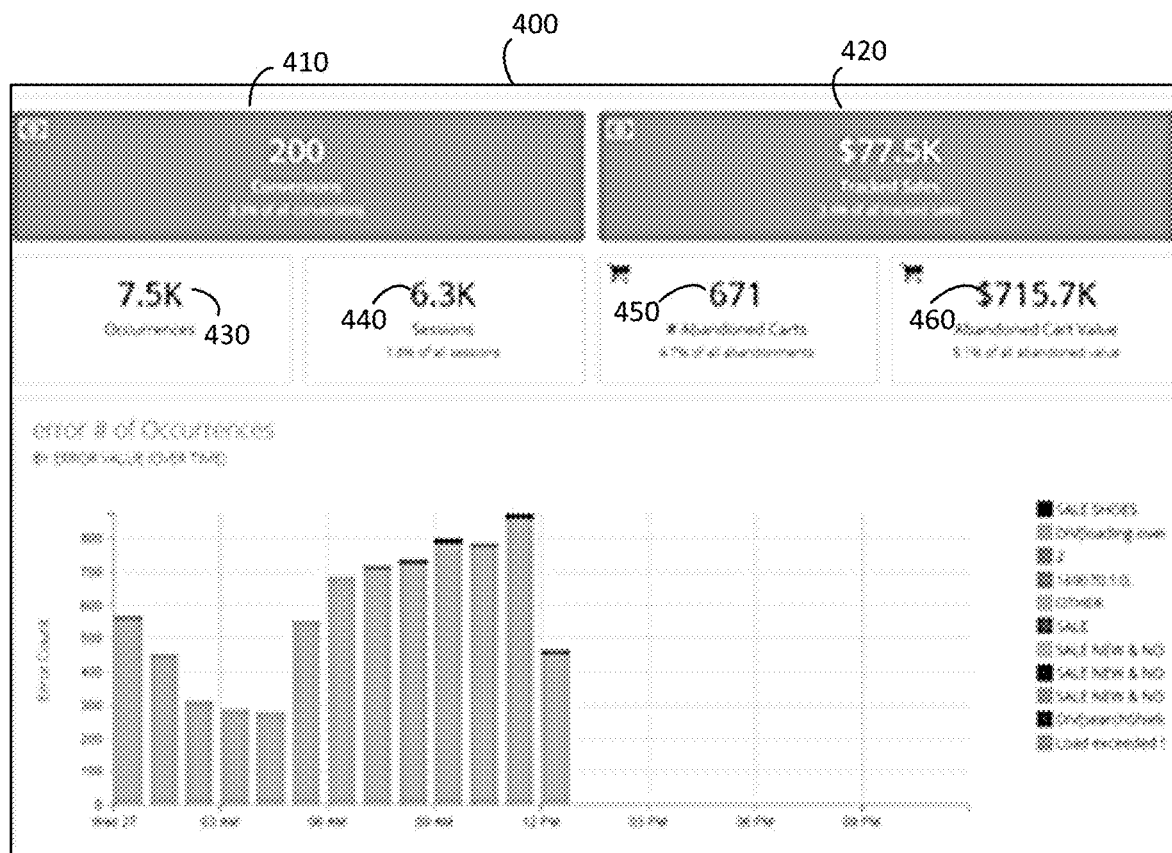
FIG. 4 illustrates an example of a user interface for depicting graphs and information related to error detection according to certain embodiments described herein.

FIG. 4 illustrates an example of user interface 400 for depicting information related to error detection according to certain embodiments described herein. User interface 400 may include information associated with multiple suspect sessions identified by an detection system (e.g., detection system 140 in FIG. 1).

The information may include a number of conversions for the multiple suspect sessions (see 410). The number of conversions may indicate a number of the sessions that resulted in a conversion, as pre-defined. Along with the number of conversions, the information may further include a percent of all conversions for the website that the number of conversions represents.

The information may further include an amount of sales for the multiple suspect sessions (see 410). The amount of sales may indicate a dollar value that resulted from the multiple suspect sessions. Along with the amount of sales, the information may further include a percent of all sales for the website that the amount of sales represents.

The information may further include a number of occurrences of a suspect attribute for the website (see 430). In some examples, a single session may include the suspect attribute multiple times.

The information may further include a number of sessions included in the multiple suspect sessions (see 440). The information may further include a percent of all sessions for the website that the number of sessions represents.

The information may further include a number of abandoned carts in the multiple suspect sessions (see 450). An abandoned cart is when one or more items are added to a cart and a user never checks out the cart. The information may further include a percent of all abandoned carts for the website that the number of abandoned carts represents.

The information may further include a total value that is included in all abandoned carts for the multiple suspect sessions (see 460). The information may further include a percent of all value left in carts for the website that the total value represents.

User interface 400 may further include a graph to represent the number of occurrences of one or more suspect attributes over time. The graph's x-axis may correspond to time and the graph's y-axis may correspond to a count of a suspect attribute. The graph may have a different color for each different suspect attribute.

Figure 5:
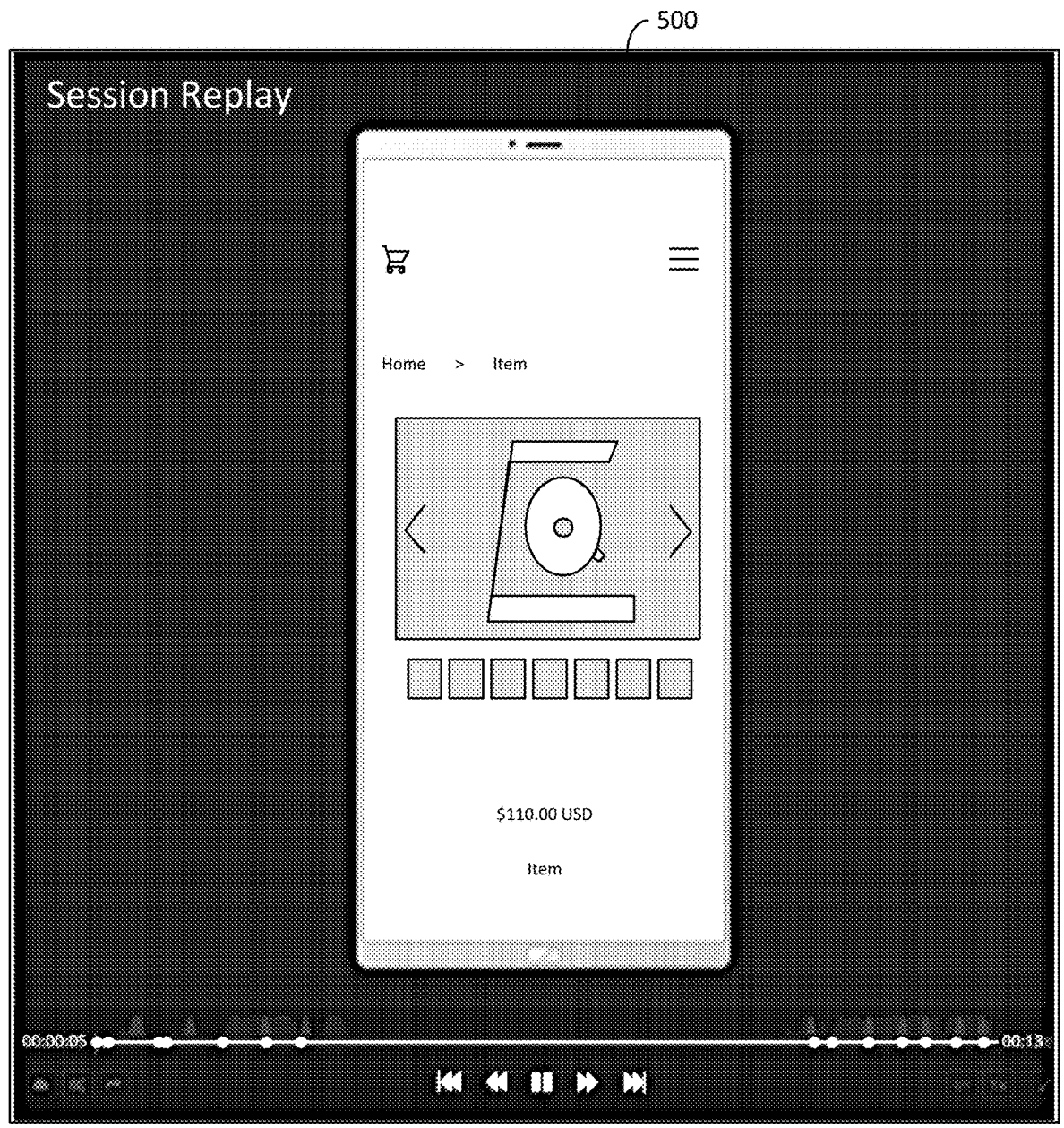
FIG. 5 illustrates an example of a user interface for replaying interactions on a device according to certain embodiments described herein.

FIG. 5 illustrates an example of user interface 500 for replaying interactions on a device according to certain embodiments described herein. User interface 500 may be paired with user interface 400 such that user interface 500 is displayed along with user interface 400. User interface 500 may be used to present one or more interactions by a user. The one or more interactions may correspond to an error occurrence included in user interface 400.

In some examples, user interface 500 may present interactions on a device to appear as a video (referred to as a playback of a user session). The playback of the user session may be the execution of operations for the original HTML DOM with mouse movements, clicks, DOM changes, or the like being applied overtop. User interface 500 may allow a user to affect the playback of the user session, such as play, pause, rewind, fast-forward, jump to next error occurrence, jump to previous error occurrence, or the like. Such operations allow the user to control what they are viewing so they may better understand what went wrong.

User interface 500 may further include one or more indicators or markers in a timeline of the playback of the user session being presented by user interface 500. A marker may allow a user to jump to a particular time location in the playback of the user session so that the user does not have to watch the playback of the user session from start to finish. In some examples, a marker may be inserted into the timeline by a user. For example, a previous user reviewing the playback of the user session may indicate that a time location is particularly important for future users to view. Indicators or markets may be automatically inserted by the detection system for events associated with suspect attributes that are correlated with the suspect sessions being abandoned. For example, if a particular java script error was determined to be correlated with sessions being abandoned, then an indicator may be inserted into the replay at the time when the javascript error was thrown.

In other examples, a marker may be automatically inserted into the timeline by an detection system (e.g., detection system 140) or some other system. For example, in response to the detection system identifying a suspect attribute, the detection system may generate a playback of a user session for each suspect session that includes the suspect attribute.

Each playback of a user session may be generated to include a first amount of time before the suspect attribute (e.g., 30 seconds), a second amount of time after the suspect attribute (e.g., 20 seconds), and a marker a third amount of time before the suspect attribute (e.g., 2 seconds). The first amount of time and the second amount of time may be the same or different. The first and second amount of time as compared to the third amount of time should be longer.

Figure 6A:
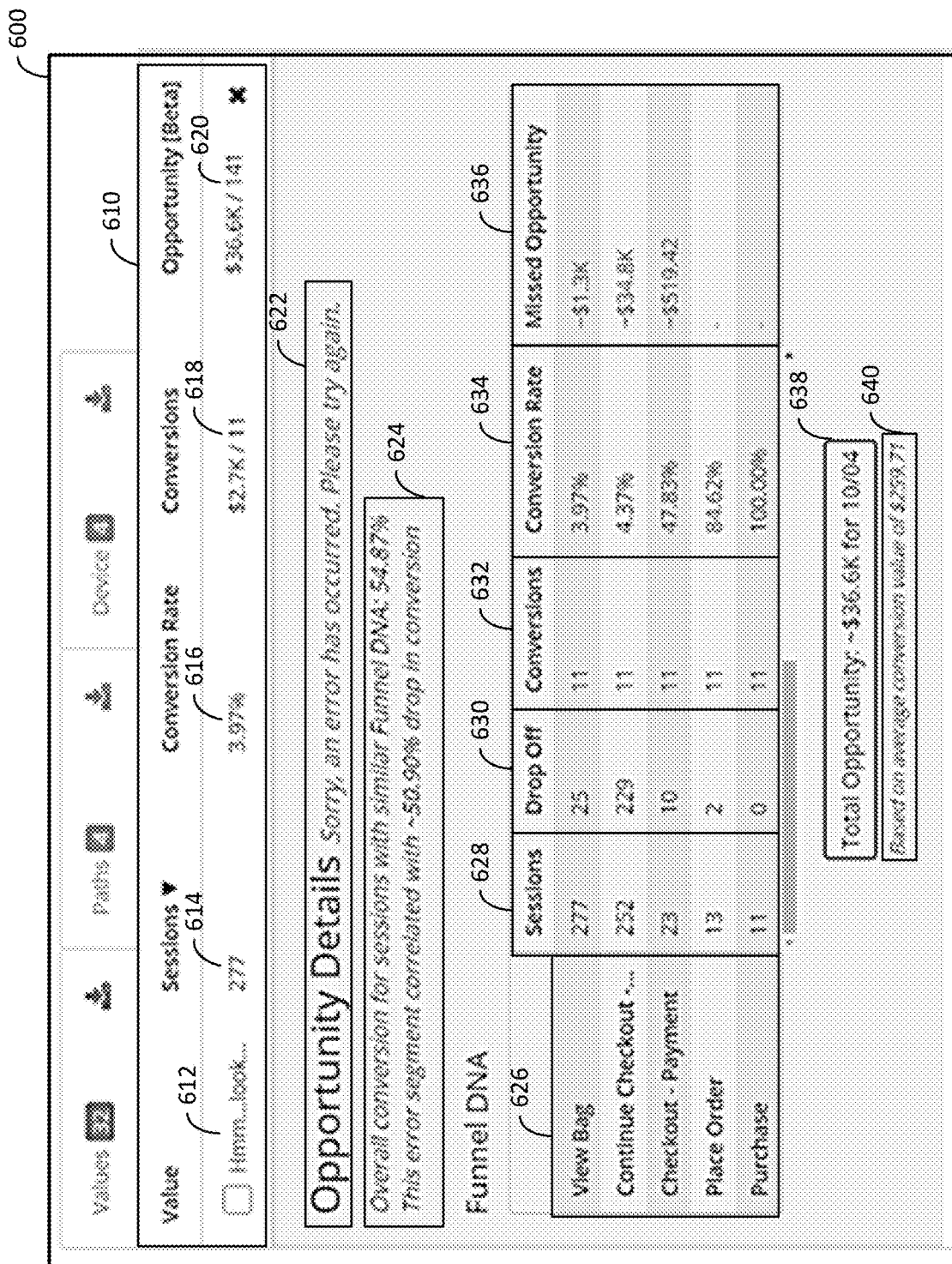
FIG. 6A illustrates an example of a user interface for depicting information related to error detection according to certain embodiments described herein.

FIG. 6A illustrates an example of user interface 600 for depicting information related to error detection according to certain embodiments described herein. User interface 600 may be included with or separate from user interface 400. For example, in FIG. 4, it is depicted that user interface 600 is included below the graph of FIG. 4. However, it should be recognized that user interface 600 may be a completely separate user interface.

User interface 600 may include summary area 610 to summarize information related to an entire conversion funnel for a particular suspect attribute. The summary information may include an identification of the suspect attribute (see 612), a number of sessions that include the suspect attribute (see 614), a conversion rate for the sessions that include the suspect attribute (see 616), the amount of value received for conversions that include the suspect attribute (see 618), a number of conversions that include the suspect attribute (also see 618), an estimate of an amount of opportunity value (e.g., an amount of value that may be received if the suspect attribute is fixed) for the suspect attribute (see 620), an estimate of a number of potential sales that may be realized if the suspect attribute is fixed (also see 620), or the like.

User interface 600 may further include further information regarding suspect sessions. For example, user interface 600 may provide a full description of a suspect attribute that is related to information being displayed (see 622). User interface 600 may further include an overall conversion rate for sessions from the same website with similar characteristics to the suspect sessions (see 624). By subtracting the overall conversion rate from the conversion rate at 616, an estimation of underperformance for the suspect sessions may be calculated and presented (see 624).

User interface 600 may further include a presentation of information regarding suspect sessions broken up between different stages of the suspect sessions. For example, the suspect sessions may all relate to a particular flow of a website that corresponds to particular webpages being viewed. In such an example, each webpage may be defined as a different stage of a conversion funnel, with information being presented for each stage. In another example, multiple stages may be associated with a single webpage, where each stage relates to a particular user interaction with the single webpage (not illustrated).

The presentation of information may include first column 626, which may include an identification of each stage. In the example depicted in FIG. 6A, the stages include "view bag," "continue checkout," "checkout-payment," "place order," and "purchase." It should be recognized that each stage may be identified differently. It should also be recognized that there may be more or less stages.

The presentation of information may also include second column 628, which may include a number of sessions for each stage. For example, the "view bag" stage is indicated to have 277 sessions in FIG. 6A. In such an example, the 277 sessions mean that 277 users have entered into the view bag stage.

The presentation of information may also include third column 630, which may include a number of sessions that dropped off for each stage. For example, the "view bag" stage is indicated to have 25 sessions that dropped off. In such an example, the 25 sessions mean that 25 users ended their session at the view bag stage.

The presentation of information may also include fourth column 632, which may include a number of sessions that resulted in a conversion for each stage. For example, the "view bag" stage is indicated to have 11 sessions that resulted in a conversion. In such an example, the 11 sessions mean that 11 users that reached the view bag stage also reached a conversion event at some point in their session. While FIG. 6A indicates the number of conversions being consistent for each stage, it should be recognized that a stage may have more or less conversions due to a user skipping a stage.

The presentation of information may also include fifth column 634, which may include a conversion rate for each stage. For example, the "view bag" stage is indicated to have a conversion rate of 3.97%. In such an example, the 3.97% may be computed by dividing the number of conversions by the number of sessions for the "view bag" stage.

The presentation of information may also include sixth column 636, which may include a value representing missed opportunity for each stage. For example, the "view bag" stage is indicated to have $1.3K of missed opportunity. In such an example, the $1.3K may be computed by multiplying an average conversion value (as discussed further below) by the number of sessions that dropped off for the "view bag" stage.

The average conversion value may represent an average amount that is expected to be received for each conversion for a particular conversion funnel. In the example depicted in FIG. 6A, the average conversion value is $259.71 (see 640). There are two primary ways to compute the average conversion value. The first way is to take an average of the cart values for each session that dropped off. The second way is to take an average of the cart values for each session that converted. However, it should be recognized that the average conversion value may be computed in other ways.

User interface 600 may further include a total missed opportunity value for a particular conversion funnel for a particular date (see 638). The total missed opportunity value may be computed by adding up the missed opportunity for each stage as described above.

Figure 6B:
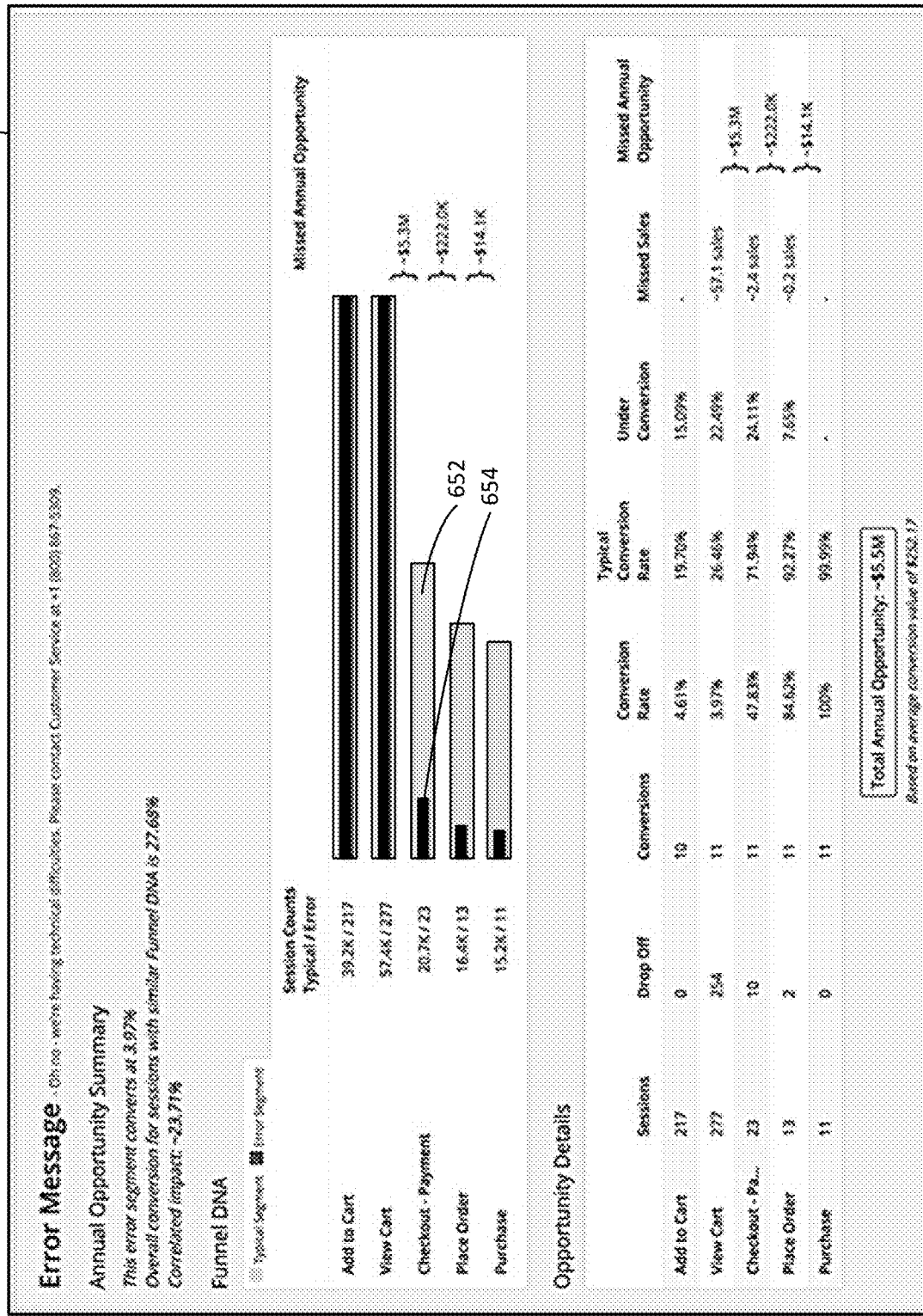
FIG. 6B illustrates an alternative example of a user interface for depicting information related to error detection according to certain embodiments described herein.

FIG. 6B illustrates an alternative example of a user interface 600 to show similar information as that shown in FIG. 6A. FIG. 6B shows information related to a suspect attribute related to an error message that may appear on a website (e.g., "we're having technical difficulties"). The suspect sessions corresponding to this suspect attribute can including the following stages: "add to cart," "view cart," "checkout—payment," "place order," and "purchase." FIG. 6B shows a bar graph of conversion rates corresponding to each of the associated stages. The light gray portion represents the segment of sessions that did not include the suspect attribute (e.g., the non-suspect sessions) and the black portion represents the suspect sessions. As shown in FIG. 6B, the gray portion 652 of the bar graph associated with "checkout—payment" presents the segment of sessions that did not include the suspect attribute and the black portion of the bar graph 654 represents the suspect sessions. The discrepancy between the length of the gray bar 652 and the black bar 654 indicates that the suspect attribute (the error associated with the error message) leads to users abandoning the session.

Figure 7:
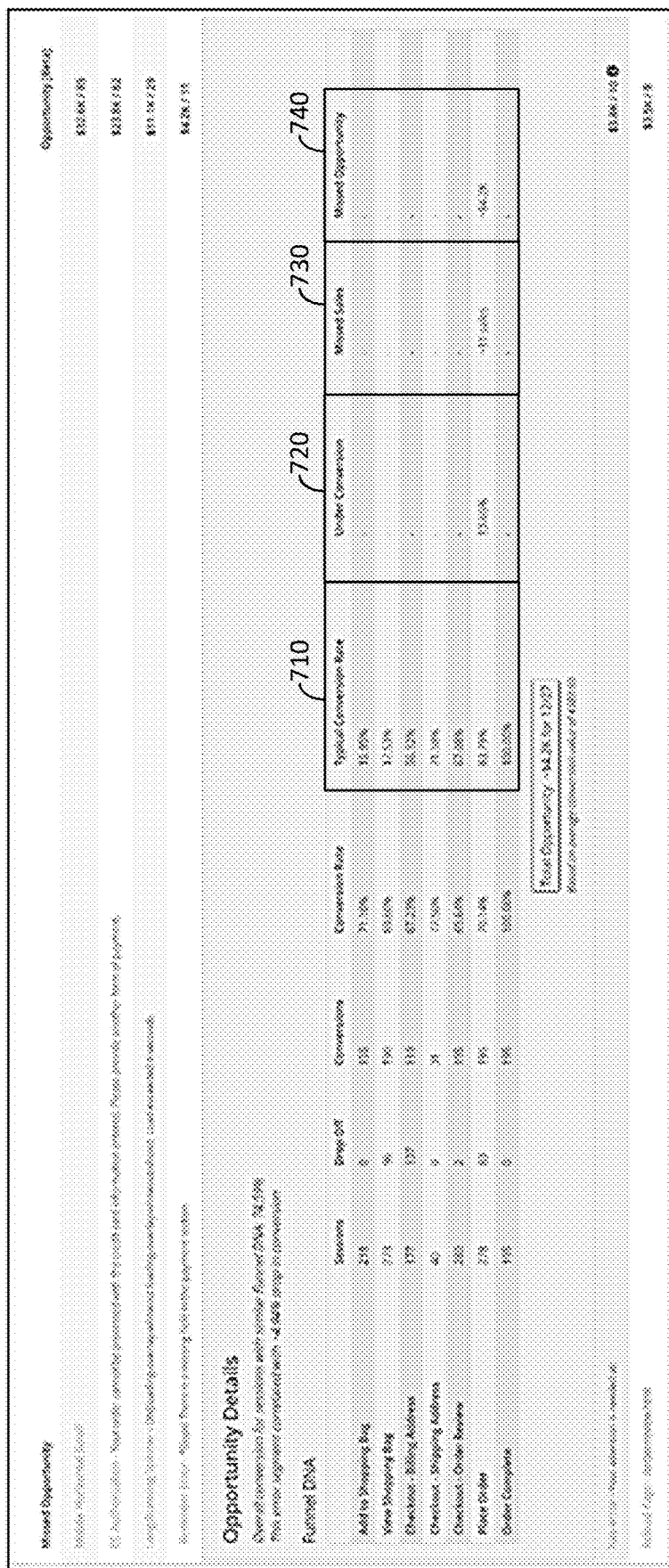
FIG. 7 illustrates another example of a user interface for depicting information related to error detection according to certain embodiments described herein.

FIG. 7 illustrates an example of user interface 700 for depicting information related to error detection according to certain embodiments described herein. The information depicted in user interface 700 may be similar to that depicted in user interface 600 with a few additions. For example, similar to user interface 600, user interface 700 may include an identification of each stage, a number of sessions that dropped off for each stage, a number of sessions that resulted in a conversion for each stage, and a conversion rate for each stage.

User interface may further include seventh column 710, which may include a typical conversion rate for each stage. For example, the "place order" stage is indicated to have a typical conversion rate of 83.7%. In such an example, a user should expect the conversion rate for the "place order" stage to be about 83.7%. The typical conversion rate may be based upon sessions for the website that were not indicated as being suspect but share one or more attributes with a sessions that has been determined to be suspect.

User interface may further include eighth column 720, which may include an under-conversion value for each stage. For example, the "place order" stage is indicated to have an under-conversion value of 13.65%. In such an example, the 13.65% may be computed by subtracting the conversion rate for a particular stage from the typical conversion rate for the particular stage.

User interface may further include ninth column 730, which may include a missed-sales value for each stage. For example, the "place order" stage is indicated to have 11 missed sales. In such an example, the 11 missed sales may be computed by multiplying a drop-off value for a stage with an under-conversion value for the stage.

User interface may further include tenth column 740, which may include a value representing missed opportunity for each stage. The value included in tenth column 740 may different than the value included in sixth column 636 in FIG. 6A. In particular, the value in tenth column 740 may be computed by multiplying a missed-sales value by an average conversion value. While the average conversion value may be computed similarly as descried above in FIG. 6A, the missed-sales value is different. For example, the "place order" stage is indicated to have about $4.2K of missed opportunity.

In addition, rather than displaying suspect session information for a single suspect attribute (as was done in user interface 600), user interface 700 may include summary information for each of multiple suspect attributes (e.g., Mobile Horizontal Scroll, CC Authorization, Long Running Spinner, Reminder Error, has-error, and Reload Page). By clicking on one of multiple suspect attributes, additional information may be presented (similar to as descried above for user interface 600). In FIG. 7, the example depicts additional information for the Reminder Error.

IV. Exemplary Computer System

Figure 8:
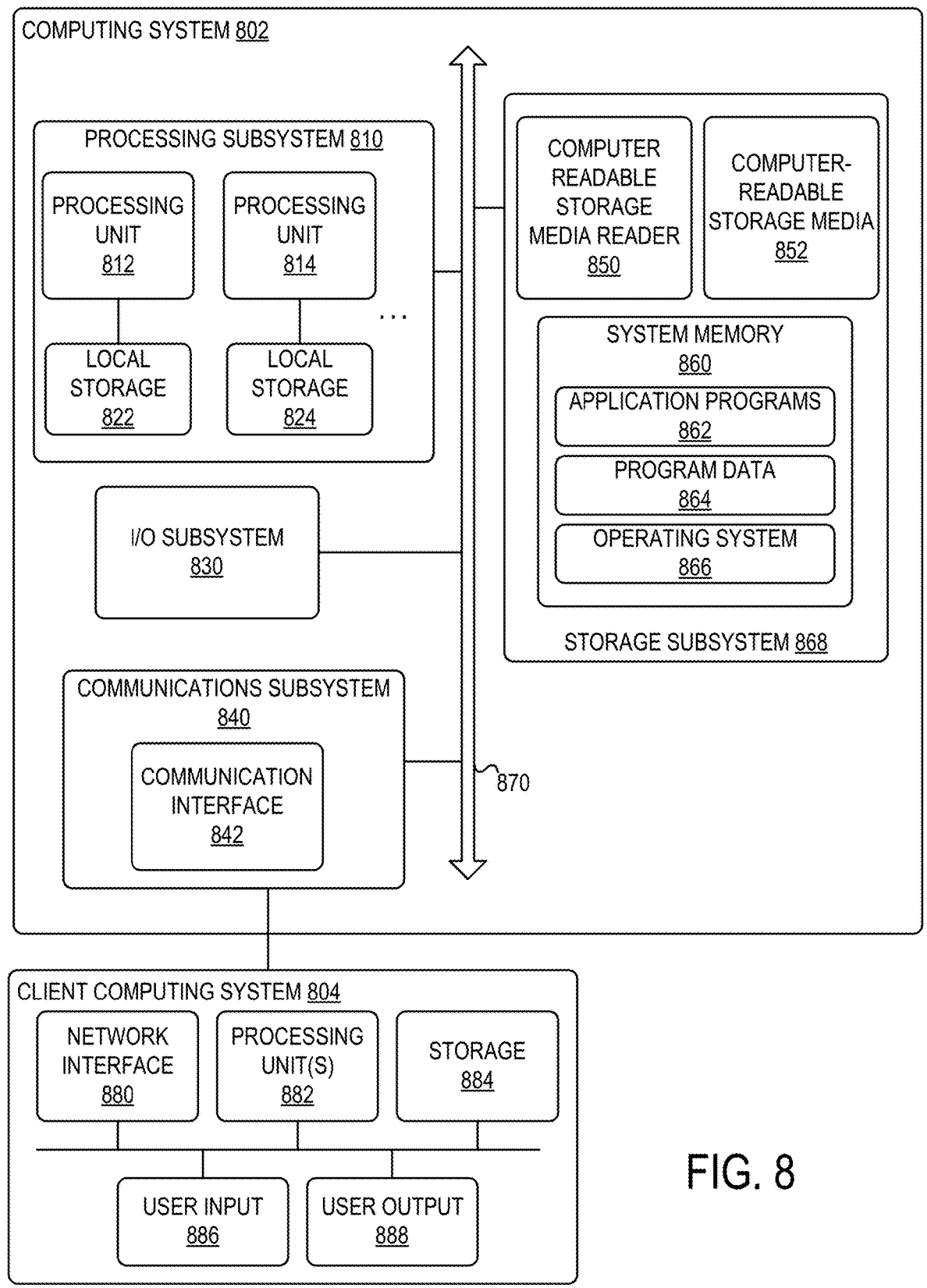
FIG. 8 illustrates an example of a computing system that may be used with certain embodiments described herein.

Various operations described herein may be implemented on computer systems, which may be of generally conventional design. FIG. 8 shows a simplified block diagram of a representative computing system 802 and client computing system 804 usable to implement certain embodiments of the present disclosure. In various embodiments, computing system 802 or similar systems may implement capture management system, or any other computing system described herein or portions thereof.

Computing system 802 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 802 may include processing subsystem 810. Processing subsystem 810 may communicate with a number of peripheral systems via bus subsystem 870. These peripheral systems may include I/O subsystem 830, storage subsystem 868, and communications subsystem 840.

Bus subsystem 870 provides a mechanism for letting the various components and subsystems of server computing system 804 communicate with each other as intended. Although bus subsystem 870 is shown schematically as a single bus, alternative embodiments of the bus subsystem may utilize multiple buses. Bus subsystem 870 may form a local area network that supports communication in processing subsystem 810 and other components of server computing system 820. Bus subsystem 870 may be implemented using various technologies including server racks, hubs, routers, etc. Bus subsystem 870 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 830 may include devices and mechanisms for inputting information to computing system 802 and/or for outputting information from or via computing system 802. In general, use of the term "input device" is intended to include all possible types of devices and mechanisms for inputting information to computing system 802. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 802 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 810 controls the operation of computing system 802 and may comprise one or more processing units 812, 814, etc. A processing unit may include one or more processors, including single core processor or multicore processors, one or more cores of processors, or combinations thereof. In some embodiments, processing subsystem 810 may include one or more special purpose co-processors such as graphics processors, digital signal processors (DSPs), or the like. In some embodiments, some or all of the processing units of processing subsystem 810 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 822, 824. Any type of processors in any combination may be included in processing unit(s) 812, 814.

In some embodiments, processing subsystem 810 may be implemented in a modular design that incorporates any number of modules (e.g., blades in a blade server implementation). Each module may include processing unit(s) and local storage. For example, processing subsystem 810 may include processing unit 812 and corresponding local storage 822, and processing unit 814 and corresponding local storage 824.

Local storage 822, 824 may include volatile storage media (e.g., conventional DRAM, SRAM, SDRAM, or the like) and/or non-volatile storage media (e.g., magnetic or optical disk, flash memory, or the like). Storage media incorporated in local storage 822, 824 may be fixed, removable or upgradeable as desired. Local storage 822, 824 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 812, 814 need at runtime. The ROM may store static data and instructions that are needed by processing unit(s) 812, 814. The permanent storage device may be a non-volatile read-and-write memory device that may store instructions and data even when a module including one or more processing units 812, 814 and local storage 822, 824 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 822, 824 may store one or more software programs to be executed by processing unit(s) 812, 814, such as an operating system and/or programs implementing various server functions such as functions of capture management system, or any other server(s) associated with capture management system. "Software" refers generally to sequences of instructions that, when executed by processing unit(s) 812, 814 cause computing system 802 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 812, 814. In some embodiments the instructions may be stored by storage subsystem 868 (e.g., computer readable storage media). In various embodiments, the processing units may execute a variety of programs or code instructions and may maintain multiple concurrently executing programs or processes. At any given time, some or all of the program code to be executed may be resident in local storage 822, 824 and/or in storage subsystem including potentially on one or more storage devices. Software may be implemented as a single program or a collection of separate programs or program modules that interact as desired. From local storage 822, 824 (or non-local storage described below), processing unit(s) 812, 814 may retrieve program instructions to execute and data to process in order to execute various operations described above.

Storage subsystem 868 provides a repository or data store for storing information that is used by computing system 802. Storage subsystem 868 provides a tangible non-transitory computer-readable storage medium for storing the basic programming and data constructs that provide the functionality of some embodiments. Software (programs, code modules, instructions) that when executed by processing subsystem 810 provide the functionality described above may be stored in storage subsystem 868. The software may be executed by one or more processing units of processing subsystem 810. Storage subsystem 868 may also provide a repository for storing data used in accordance with the present disclosure.

Storage subsystem 868 may include one or more non-transitory memory devices, including volatile and non-volatile memory devices. As shown in FIG. 8, storage subsystem 868 includes a system memory 860 and a computer-readable storage media 852. System memory 860 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 802, such as during start-up, may typically be stored in the ROM. The RAM typically contains data and/or program modules that are presently being operated and executed by processing subsystem 810. In some implementations, system memory 860 may include multiple different types of memory, such as static random access memory (SRAM) or dynamic random access memory (DRAM). Storage subsystem 868 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 868.

By way of example, and not limitation, as depicted in FIG. 8, system memory 860 may store application programs 862, which may include client applications, Web browsers, mid-tier applications, relational database management systems (RDBMS), etc., program data 864, and one or more operating systems 866. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 852 may store programming and data constructs that provide the functionality of some embodiments. Software (programs, code modules, instructions) that when executed by processing subsystem 810 a processor provide the functionality described above may be stored in storage subsystem 868. By way of example, computer-readable storage media 852 may include non-volatile memory such as a hard disk drive, a magnetic disk drive, an optical disk drive such as a CD ROM, DVD, a Blu-Ray® disk, or other optical media. Computer-readable storage media 852 may include, but is not limited to, Zip® drives, flash memory cards, universal serial bus (USB) flash drives, secure digital (SD) cards, DVD disks, digital video tape, and the like. Computer-readable storage media 852 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 852 may provide storage of computer-readable instructions, data structures, program modules, and other data for computing system 802.

In certain embodiments, storage subsystem 868 may also include a computer-readable storage media reader 850 that may further be connected to computer-readable storage media 852. Together and, optionally, in combination with system memory 860, computer-readable storage media 852 may comprehensively represent remote, local, fixed, and/or removable storage devices plus storage media for storing computer-readable information.

In certain embodiments, computing system 802 may provide support for executing one or more virtual machines. Computing system 802 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 802. Accordingly, multiple operating systems may potentially be run concurrently by computing system 802. Each virtual machine generally runs independently of the other virtual machines.

Communication subsystem 840 provides an interface to other computer systems and networks. Communication subsystem 840 serves as an interface for receiving data from and transmitting data to other systems from computing system 802. For example, communication subsystem 840 may enable computing system 802 to establish a communication channel to one or more client computing devices via the Internet for receiving and sending information from and to the client computing devices.

Communication subsystem 840 may support both wired and/or wireless communication protocols. For example, in certain embodiments, communication subsystem 840 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 840 may provide wired network connectivity (e.g., Ethernet) in addition to or instead of a wireless interface.

Communication subsystem 840 may receive and transmit data in various forms. For example, in some embodiments, communication subsystem 840 may receive input communication in the form of structured and/or unstructured data feeds, event streams, event updates, and the like. For example, communication subsystem 840 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 840 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 840 may also be configured to output the structured and/or unstructured data feeds, event streams, event updates, and the like to one or more databases that may be in communication with one or more streaming data source computers coupled to computing system 802.

Communication subsystem 840 may provide a communication interface 842, e.g., a WAN interface, which may provide data communication capability between the local area network (bus subsystem 870) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 802 may operate in response to requests received via communication interface 842. Further, in some embodiments, communication interface 842 may connect computing systems 802 to each other, providing scalable systems capable of managing high volumes of activity. Conventional or other techniques for managing server systems and server farms (collections of server systems that cooperate) may be used, including dynamic resource allocation and reallocation.

Computing system 802 may interact with various user-owned or user-operated devices via a wide-area network such as the Internet. An example of a user-operated device is shown in FIG. 8 as client computing system 802. Client computing system 804 may be implemented, for example, as a consumer device such as a smart phone, other mobile phone, tablet computer, wearable computing device (e.g., smart watch, eyeglasses), desktop computer, laptop computer, and so on.

For example, client computing system 804 may communicate with computing system 802 via communication interface 842. Client computing system 804 may include conventional computer components such as processing unit(s) 882, storage device 884, network interface 880, user input device 886, and user output device 888. Client computing system 804 may be a computing device implemented in a variety of form factors, such as a desktop computer, laptop computer, tablet computer, smart phone, other mobile computing device, wearable computing device, or the like.

Processing unit(s) 882 and storage device 884 may be similar to processing unit(s) 812, 814 and local storage 822, 824 described above. Suitable devices may be selected based on the demands to be placed on client computing system 804; for example, client computing system 804 may be implemented as a "thin" client with limited processing capability or as a high-powered computing device. Client computing system 804 may be provisioned with program code executable by processing unit(s) 882 to enable various interactions with computing system 802 of a message management service such as accessing messages, performing actions on messages, and other interactions described above. Some client computing systems 804 may also interact with a messaging service independently of the message management service.

Network interface 880 may provide a connection to a wide area network (e.g., the Internet) to which communication interface 840 of computing system 802 is also connected. In various embodiments, network interface 880 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 886 may include any device (or devices) via which a user may provide signals to client computing system 804; client computing system 804 may interpret the signals as indicative of particular user requests or information. In various embodiments, user input device 886 may include any or all of a keyboard, touch pad, touch screen, mouse or other pointing device, scroll wheel, click wheel, dial, button, switch, keypad, microphone, and so on.

User output device 888 may include any device via which client computing system 804 may provide information to a user. For example, user output device 888 may include a display to display images generated by or delivered to client computing system 804. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 888 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 812, 814 and 882 may provide various functionality for computing system 802 and client computing system 804, including any of the functionality described herein as being performed by a server or client, or other functionality associated with message management services.

It will be appreciated that computing system 802 and client computing system 804 are illustrative and that variations and modifications are possible. Computer systems used in connection with embodiments of the present disclosure may have other capabilities not specifically described here. Further, while computing system 802 and client computing system 804 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While this disclosure has been described with respect to specific embodiments, one skilled in the art will recognize that numerous modifications are possible. For instance, although specific processes are described with reference to FIGS. 1 and 2, other processes may be implemented. Embodiments of this disclosure may be realized using a variety of computer systems and communication technologies including but not limited to specific examples described herein.

In the detailed description of exemplary embodiments of this disclosure, reference is made to the accompanying drawings which form a part hereof, and in which is shown by way of illustration specific exemplary embodiments in which this disclosure may be practiced. These embodiments are described in sufficient detail to enable those skilled in the art to practice this disclosure, and it is to be understood that other embodiments may be utilized and that logical, mechanical, electrical and other changes may be made without departing from the scope of the present disclosure.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer apparatus may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of this disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, this disclosure can include any variety of combinations and/or integrations of the embodiments disclosed herein. However, other embodiments of this disclosure may be directed to specific embodiments relating to each individual aspect, or specific combinations of these individual aspects. Thus, although this disclosure has been described with respect to specific embodiments, it will be appreciated that this disclosure is intended to cover all modifications and equivalents within the scope of the following claims.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that this disclosure is not limited to the precise construction and components disclosed herein and that various modifications, changes and variations which will be apparent to those skilled in the art may be made in the arrangement, operation and details of the method and apparatus of the present disclosure herein without departing from the spirit and scope of this disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for assessing one or more webpages of a website, the method comprising:
   obtaining, by a detection system, session information for each of a plurality of previous sessions on the website, the session information for a particular previous session including session attributes of the particular previous session, each previous session being associated with one or more stages of the website entered into during that previous session;
   identifying, by the detection system, a plurality of suspect sessions from the plurality of previous sessions based on determining that the previous session includes a suspect attribute;
   determining, by the detection system, a set of one or more stages associated with at least one of the plurality of suspect sessions;
   computing, by the detection system based on the plurality of suspect sessions, a suspect conversion rate for the set of one or more stages;
   identifying, by the detection system, a plurality of non-suspect sessions not including the suspect attribute;
   computing, by the detection system based on the plurality of non-suspect sessions, an expected conversion rate for set of one or more stages;

computing, by the detection system, an under-conversion rate for the set of one or more stages based upon the suspect conversion rate and the expected conversion rate; and determining, by the detection system, a correlation between the suspect attribute and suspect sessions being abandoned based on the under-conversion rate for the set of one or more stages; and providing, by the detection system, the suspect attribute and the correlation for determining a likelihood of the suspect attribute causing the suspect sessions to be abandoned.

2. The method of claim 1, wherein the suspect attribute indicates a hindrance to users of the website.

3. The method of claim 1, further comprising:
automatically inserting a marker into a suspect session based on the suspect attribute and the correlation.

4. The method of claim 1, wherein the expected conversion rate is determined using all sessions occurring on the website.

5. The method of claim 1, wherein the suspect attribute is selected from a group consisting of:
repetitive clicks from an input device, random key inputs from the input device, use of a coupon, slow response time, a user repeating a stage where a majority of users of the website only interact with the stage once, a specific error message being displayed, a failed login, a JavaScript error, and a connection speed.

6. The method of claim 1, wherein the suspect conversion rate for the set of one or more stages is computed by dividing a number of sessions that progress past the set of one or more stages by a total number of sessions including the set of one or more stages.

7. The method of claim 1, wherein the expected conversion rate for the set of one or more stages is computed based upon a total number of the plurality of non-suspect sessions and a number of the plurality of non-suspect sessions that included the set of one or more stages.

8. The method of claim 1, wherein the expected conversion rate for the set of one or more stages includes a percentage of users that progress past the set of one or more stages.

9. The method of claim 1, further comprising:
presenting, by the detection system, a replay of a suspect session with a timeline having indicators of events associated with the suspect attribute that are correlated with the suspect sessions being abandoned.

10. The method of claim 1, further comprising:
determining, by the detection system, a drop-off value for the set of one or more stages, wherein the drop-off value is a number of the plurality of suspect sessions that terminated in a stage of the set of one or more stages;

computing, by the detection system, a missed-conversion value for set of one or more stages, wherein the missed-conversion value is computed based upon an average conversion value, the under-conversion rate, and the drop-off value; and providing, by the detection system, the missed-conversion value for determining the likelihood of the suspect attribute causing the suspect sessions to be abandoned.

11. A system comprising:
one or more processors; and
a non-transitory computer-readable medium including instructions that, when executed by the one or more processors, cause the one or more processors to perform operations for assessing one or more webpages of a website, the operations comprising:

obtaining, by a detection system, session information for each of a plurality of previous sessions on the website, the session information for a particular previous session including session attributes of the particular previous session, each previous session being associated with one or more stages of the website entered into during that previous session;

identifying, by the detection system, a plurality of suspect sessions from the plurality of previous sessions based on determining that the previous session includes a suspect attribute;

determining, by the detection system, a set of one or more stages associated with at least one of the plurality of suspect sessions;

computing, by the detection system based on the plurality of suspect sessions, a suspect conversion rate for the set of one or more stages;

identifying, by the detection system, a plurality of non-suspect sessions not including the suspect attribute;

computing, by the detection system based on the plurality of non-suspect sessions, an expected conversion rate for set of one or more stages;

computing, by the detection system, an under-conversion rate for the set of one or more stages based upon the suspect conversion rate and the expected conversion rate; and determining, by the detection system, a correlation between the suspect attribute and suspect sessions being abandoned based on the under-conversion rate for the set of one or more stages; and providing, by the detection system, the suspect attribute and the correlation for determining a likelihood of the suspect attribute causing the suspect sessions to be abandoned.

12. The system of claim 11, wherein the suspect attribute indicates a hindrance to users of the website.

13. The system of claim 11, wherein the operations further comprise:
automatically inserting a marker into a suspect session based on the suspect attribute and the correlation.

14. The system of claim 11, wherein the expected conversion rate is determined using all sessions occurring on the website.

15. The system of claim 11, wherein the suspect attribute is selected from a group consisting of:
repetitive clicks from an input device, random key inputs from theme input device, use of a coupon, slow response time, a user repeating a stage where a majority of users of the website only interact with the stage once, a specific error message being displayed, a failed login, a JavaScript error, and a connection speed.

16. The system of claim 11, wherein the suspect conversion rate for the set of one or more stages is computed by dividing a number of sessions that progress past the set of one or more stages by a total number of sessions including the set of one or more stages.

17. The system of claim 11, wherein the expected conversion rate for the set of one or more stages is computed based upon a total number of the plurality of non-suspect sessions and a number of the plurality of non-suspect sessions that included the set of one or more stages.

18. The system of claim 11, wherein the expected conversion rate for the set of one or more stages includes a percentage of users that progress past the set of one or more stages.

19. The system of claim 11, wherein the operations further comprise:
presenting, by the detection system, a replay of a suspect session with a timeline having indicators of events associated with the suspect attribute that are correlated with the suspect sessions being abandoned.

20. The system of claim 11, wherein the operations further comprise:
determining, by the detection system, a drop-off value for the set of one or more stages, wherein the drop-off value is a number of the plurality of suspect sessions that terminated in a stage of the set of one or more stages;
computing, by the detection system, a missed-conversion value for set of one or more stages, wherein the missed-conversion value is computed based upon an average conversion value, the under-conversion rate, and the drop-off value; and
providing, by the detection system, the missed-conversion value for determining the likelihood of the suspect attribute causing the suspect sessions to be abandoned.

* * * * *

UNITED STATES PATENT AND TRADEMARK OFFICE
CERTIFICATE OF CORRECTION

| | | |
|---|---|---|
| PATENT NO. | : 11,838,350 B2 | Page 1 of 1 |
| APPLICATION NO. | : 17/743346 | |
| DATED | : December 5, 2023 | |
| INVENTOR(S) | : Mario Luciano Ciabarra, Jr. | |

It is certified that error appears in the above-identified patent and that said Letters Patent is hereby corrected as shown below:

In the Claims

In Column 36, Line 52, in Claim 15: please delete "theme" and insert --the--.

Signed and Sealed this
Sixth Day of February, 2024

Katherine Kelly Vidal
*Director of the United States Patent and Trademark Office*